United States Patent
Stein et al.

(10) Patent No.: US 6,289,212 B1
(45) Date of Patent: Sep. 11, 2001

(54) METHOD AND APPARATUS FOR PROVIDING ELECTRONIC MAIL SERVICES DURING NETWORK UNAVAILABILITY

(75) Inventors: Lawrence M. Stein, San Jose; Peter F. King, Half Moon Bay; Bruce K. Martin, Jr., Palo Alto; Bruce V. Schwartz, San Mateo; Paul A. Smethers, Cupertino, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/172,105

(22) Filed: Oct. 13, 1998

Related U.S. Application Data

(60) Provisional application No. 60/100,663, filed on Sep. 16, 1998.

(51) Int. Cl.[7] .................................................. H04M 11/10
(52) U.S. Cl. ........................... 455/412; 455/557; 455/575
(58) Field of Search ................................... 455/412, 556, 455/557, 403, 555, 575, 567, 418, 419

(56) References Cited

U.S. PATENT DOCUMENTS

| | | | |
|---|---|---|---|
| 5,438,611 | * | 8/1995 | Campana, Jr. et al. ............ 379/58 |
| 5,461,667 | * | 10/1995 | Remilard ................................ 379/96 |
| 5,487,100 | * | 1/1996 | Kane ...................................... 379/57 |

(List continued on next page.)

FOREIGN PATENT DOCUMENTS

| | | | |
|---|---|---|---|
| 0 845 894 A2 | 6/1998 | (EP) | .............................. H04M/3/50 |
| 0 924 921 A1 | 6/1999 | (EP) | .............................. H04M/11/08 |
| EP0994608A2 | * 4/2000 | (GB) | ............................. H04L/12/58 |
| WO98/10580 | 3/1998 | (WO) | ............................. H04M/11/08 |

OTHER PUBLICATIONS

HDML 2.0 Language Reference, Version 2.0, Unwired Planet, Inc. Software Developer Kit, Jul. 1997.
"HDTP Draft Specification", Version 1.1, Unwired Planet, Inc. 1997.
"Wireless Application Protocol Wireless Session Protocol Specification" (WAP WSP), Version 30, Apr. 30, 1998.
"Wireless Application Protocol Wireless Markup Language Specification" (WAP WML), Version Apr. 30, 1998.
Document Object Model (DOM), W3C Specification, Jul. 20, 1998 http://www.w3.org/TR/1998/WD-DOM-19980720/.
Lambert, "PCMAIL: A Distributed Mail System for Personal Computers," RFC 1056, Jun. 1988.
Kaashoek et al., "Dynamic Documents: Mobile Wireless Access to the WWW," Proceedings of Workshop on Mobile Computing Systems and Applications, IEEE Computer Society Press, Dec. 1994, pp. 179–184.
Hild, "Mobilizing Applications," IEEE Personal Communications, vol. 4, No. 5, Oct. 1997, pp. 26–34.

* cited by examiner

*Primary Examiner*—Daniel Hunter
*Assistant Examiner*—C. Chow
(74) *Attorney, Agent, or Firm*—Beyer Weaver & Thomas, LLP

(57) ABSTRACT

Improved techniques for providing electronic mail services across a network are disclosed. A mail server and its clients communicate through a network. Although the mail server centrally manages the electronic mail services, the clients are able to themselves locally perform certain electronic mail services when the network is unavailable. Accordingly, clients seeking to perform electronic mail services no longer endure significant delays when the network is unavailable. The network can be unavailable for a variety of reasons, including: congestion, out of range, network failure, etc. The network can be wired or wireless. The invention is particularly well suited for networks having sporadic connectivity, high latencies or excessive traffic.

38 Claims, 15 Drawing Sheets

U.S. PATENT DOCUMENTS

| | | | |
|---|---|---|---|
| 5,579,472 | * 11/1996 | Keyworth, II et al. | 395/326 |
| 5,809,415 | 9/1998 | Rossmann | 455/422 |
| 5,822,692 | * 10/1998 | Krishan et al. | 455/419 |
| 5,903,652 | * 5/1999 | Mital | 380/25 |
| 5,933,478 | * 8/1999 | Ozaki et al. | 379/93.24 |
| 5,987,609 | * 11/1999 | Hasebe | 713/200 |
| 6,006,087 | * 8/1999 | Amin | 455/413 |
| 6,014,559 | * 1/2000 | Amin | 455/413 |
| 6,052,735 | * 4/2000 | Ulrich et al. | 709/236 |
| 6,055,426 | * 4/2000 | Beasley | 455/432 |
| 6,065,120 | * 5/2000 | Laursen et al. | 713/201 |
| 6,094,681 | * 7/2000 | Shaffer et al. | 709/224 |
| 6,101,244 | * 8/2000 | Okada | 379/100.08 |
| 6,108,688 | * 8/2000 | Nielson | 709/206 |
| 6,181,736 | * 1/2001 | Mclaughlin et al. | 375/222 |

METHOD AND APPARATUS FOR PROVIDING ELECTRONIC MAIL SERVICES DURING NETWORK UNAVAILABILITY

CROSS-REFERENCE TO RELATED APPLICATIONS

This application claims the benefit of U.S. Provisional Application No. 60/100,663, filed Sep. 16, 1998, and entitled "WIRELESS MOBILE DEVICES HAVING IMPROVED OPERATION DURING NETWORK UNAVAILABILITY", the content of which is hereby incorporated by reference. This application is also related to U.S. application Ser. No. 09/170,879, filed concurrently herewith, and entitled "WIRELESS MOBILE DEVICES HAVING IMPROVED OPERATION DURING NETWORK UNAVAILABILITY", the content of which is hereby incorporated by reference.

BACKGROUND OF THE INVENTION

1. Field of the Invention

The present invention relates to providing electronic mail services, and more particularly, to providing electronic mail services during network unavailability.

2. Description of the Related Art

Electronic mail (email) is a popular way to communicate with others. Electronic mail systems operate to send messages over a network. The network can include internal networks and external (e.g., public) networks. An example of an internal network is a corporate network, and an example of an external network is the Internet. Typically, the electronic mail systems are corporate wide systems that reside on an internal network but also permit coupling to an external network so that messages can be exchanged with other electronic mail systems.

Recently, Internet-based electronic mail systems have been developed and implemented to provide electronic mail services over the Internet. In such systems, there is no internal network because the electronic mail system resides on the Internet. The electronic mail system has a mail server that interacts with users' network browsers so that users are able to request electronic mail services which are performed by the mail server. Typically, the mail server is a Hyper Text Transfer Protocol (HTTP) server.

These Internet-based electronic mail systems have been implemented over wired networks as well as wireless networks. The availability of the network determines whether a client application (e.g., network browser) is in communication with the mail server. The client application operates on a local machine, whereas the mail server operates on a remote machine. In the case of wired networks, the local machine is, for example, a desktop computer. In the case of wireless networks, the local machine is a mobile device. For example, the mobile device can be a mobile telephone, a personal digital assistant (PDA) or a portable computer that has wireless access to the mail server.

One problem with the conventional electronic mail systems is that the operation of client applications are very much dependent on availability of their network. In other words, when the network is unavailable, the client applications can become "hung", namely stopping further processing until a response from a remote server via the network is received. The network can be a wired network or a wireless network. Unavailability of a wired network can be due to high congestion or server failure. Unavailability of a wireless network can result from a user of a mobile device (supporting the client application) exceeding the geographic range of coverage. Unavailability also effectively results from a wireless network having high latencies, sporadic connectivity, high congestion or server failure. Because of the dependency of the operation of client applications on the availability of networks, client applications often have to wait for resources from a mail server. These wait times are unacceptably long when the network is unavailable to the client applications.

Computers or mobile devices are often provided with cache memories that temporarily store previously requested and obtained resources from remote servers. A cache memory is helpful in reducing the dependency of the computers or mobile devices on network availability. However, the cache memory is only helpful when the newly requested resource happens to reside in the cache memory. Hence, if the newly requested resource was not previously requested, then the newly requested resource would not be stored in the cache memory. Also, even if the newly requested resource were at one point in time stored in the cache memory, a reclamation or clean-up algorithm could have removed it from the cache memory to provide space for newer requested resources. Still further, the cache memory has to be relatively large to store all the resources likely to be requested. However, mobile devices (particularly hand-held mobile devices) need to keep cache memories relatively small due to power, cost and space limitations.

In the case of Internet-based electronic mail systems, a network browser operates on the computer or mobile device to enable access and manipulation their electronic mail residing on a mail server over the Internet. Since the network browsers often request electronic mail resources from remote mail servers over the network, the network browsers are particularly sensitive to network unavailability (e.g., due to out of coverage, high latencies, or sporadic connectivity). Consequently, even with a conventional cache memory, it is common for network unavailability to induce significant delays for the users of network browsers on computers or mobile devices.

Thus, there is a need for techniques to reduce delays faced by users seeking to perform electronic mail services with a mail server across a network.

SUMMARY OF THE INVENTION

Broadly speaking, the invention relates to improved techniques for providing electronic mail services across a network. A mail server and its clients communicate through the network. Although the mail server centrally manages the electronic mail services, the clients are able to themselves locally perform certain electronic mail services when the network is unavailable. Accordingly, clients seeking to perform electronic mail services no longer endure significant delays when the network is unavailable. The network can be at least temporarily unavailable for a variety of reasons, including: congestion, out of range, network failure, etc. The network can be wired or wireless. The invention is particularly well suited for networks having sporadic connectivity, high latencies or excessive traffic.

The invention can be implemented in numerous ways, including as a method, a computer readable medium, an apparatus, and a system. Several embodiments of the invention are discussed below.

As a mobile device for use with a wireless data communication network, an embodiment of the invention includes: a memory storage device that stores electronic mail resources; an electronic mail processor that performs an electronic mail operation with respect to the electronic mail resources stored in said memory storage device, and where the electronic mail operation can be carried out at said mobile device even when the wireless data communication network is not available to said mobile device; and a display device that displays at least a part of one or more of the electronic mail resources.

As a method for interacting with electronic mail messages on a mobile device, the mobile device being able to communicate with a mail server at least in part through a wireless data network, an embodiment of the invention includes the acts of: pre-loading electronic mail message resources into a storage device of the mobile device; receiving a request to view an electronic mail list; determining whether the electronic mail list is available from the storage device of the mobile device; receiving the electronic mail list from the storage device when the electronic mail list is determined to be available from the storage device of the mobile device; requesting and subsequently receiving the electronic mail list from the mail server when the electronic mail list is determined not to be available from the storage device of the mobile device; and displaying the received electronic mail list.

As a method for interacting with electronic mail messages on a mobile device, the mobile device being able to connect to a remote mail server through a wireless data network, an embodiment of the invention includes: displaying an electronic mail list on a display screen of the mobile device, the electronic mail list including one or more entries that identify particular electronic mail messages; selecting one of the entries of the electronic mail list being displayed on the display screen of the mobile device; performing an operation on the electronic mail message associated with the selected entry without delay due to the unavailability of the wireless data network to the mobile device; and asynchronously sending a notification to the remote mail server based on the operation performed on the electronic mail message associated with the selected entry when the wireless data network is available to the mobile device.

As a computer readable medium including computer program code for interacting with electronic mail messages on a computing device, the computing device being able to communicate with a mail server at least in part through a data network, an embodiment of the invention includes: computer program code configured to pre-load electronic mail message resources into a storage device of the computing device; computer program code configured to receive a request to view an electronic mail list; computer program code configured to determine whether the electronic mail list is available from the storage device of the computing device; computer program code configured to receive the electronic mail list from the storage device when the electronic mail list is determined to be available from the storage device of the computing device; computer program code configured to request and subsequently receive the electronic mail list from the mail server when the electronic mail list is determined not to be available from the storage device of the computing device; and computer program code configured to display the received electronic mail list.

As a computer readable medium for interacting with electronic mail messages on a computing device, the computing device being able to connect to a remote mail server through a data network, an embodiment of the invention includes: computer program code configured to display an electronic mail list on a display screen of the computing device, the electronic mail list including one or more entries that identify particular electronic mail messages; computer program code configured to select one of the entries of the electronic mail list being displayed on the display screen of the computing device; computer program code configured to perform an operation on the electronic mail message associated with the selected entry without delay due to the unavailability of the wireless data network to the computing device; and computer program code configured to asynchronously send a notification to the remote mail server based on the operation performed on the electronic mail message associated with the selected entry when the data network is available to the computing device.

The advantages of the invention are numerous. Several advantages that embodiments of the invention may include are as follows. One advantage of the invention is that electronic mail services can be performed on electronic mail messages even when the network is unavailable. Clients, e.g., mobile devices, are able to perform electronic mail services regardless of network availability. As a result, clients experience better responsiveness and less waiting. Another advantage of the invention is that a mail server located on the network is able to be kept current by use of asynchronous messaging. Still another advantage of the invention is the intelligent management of the memory resources of the clients which are being consumed by the electronic mail services.

Other aspects and advantages of the invention will become apparent from the following detailed description, taken in conjunction with the accompanying drawings which illustrate, by way of example, the principles of the invention.

BRIEF DESCRIPTION Of THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for providing electronic mail services across a network. A mail server and its clients communicate through the network. Although the mail server centrally manages the electronic mail services, clients are able to themselves locally perform certain electronic mail services when the network is unavailable. Accordingly, clients seeking to perform electronic mail services no longer endure significant delays when the network is unavailable. The network can be at least temporarily unavailable for a variety of reasons, including: congestion, out of range, network failure, etc. The network can be wired or wireless. The invention is particularly well suited for networks having sporadic connectivity, high latencies or excessive traffic.

While the invention is useful for both wired and wireless networks, the invention is described below with reference to a wireless communication system since wireless networks more often suffer network unavailability. In a wireless communication system, a wireless network (wireless carrier network) generally supports connection of a plurality of mobile devices to a wired network. The mobile devices communicate with server machines on the wired network to request and receive various resources. The wired network can be of different types. One type of wired network is the Internet. The invention pertains to the facilitating of operation of mobile devices when the wireless or wired network is unavailable such that the mobile devices are unable to communicate with the server machines, such as a mail server.

Embodiments of the invention are discussed below with reference to FIGS. 1–14. However, those skilled in the art will readily appreciate that the detailed description given herein with respect to these figures is for explanatory purposes as the invention extends beyond these limited embodiments.

Figure 1:
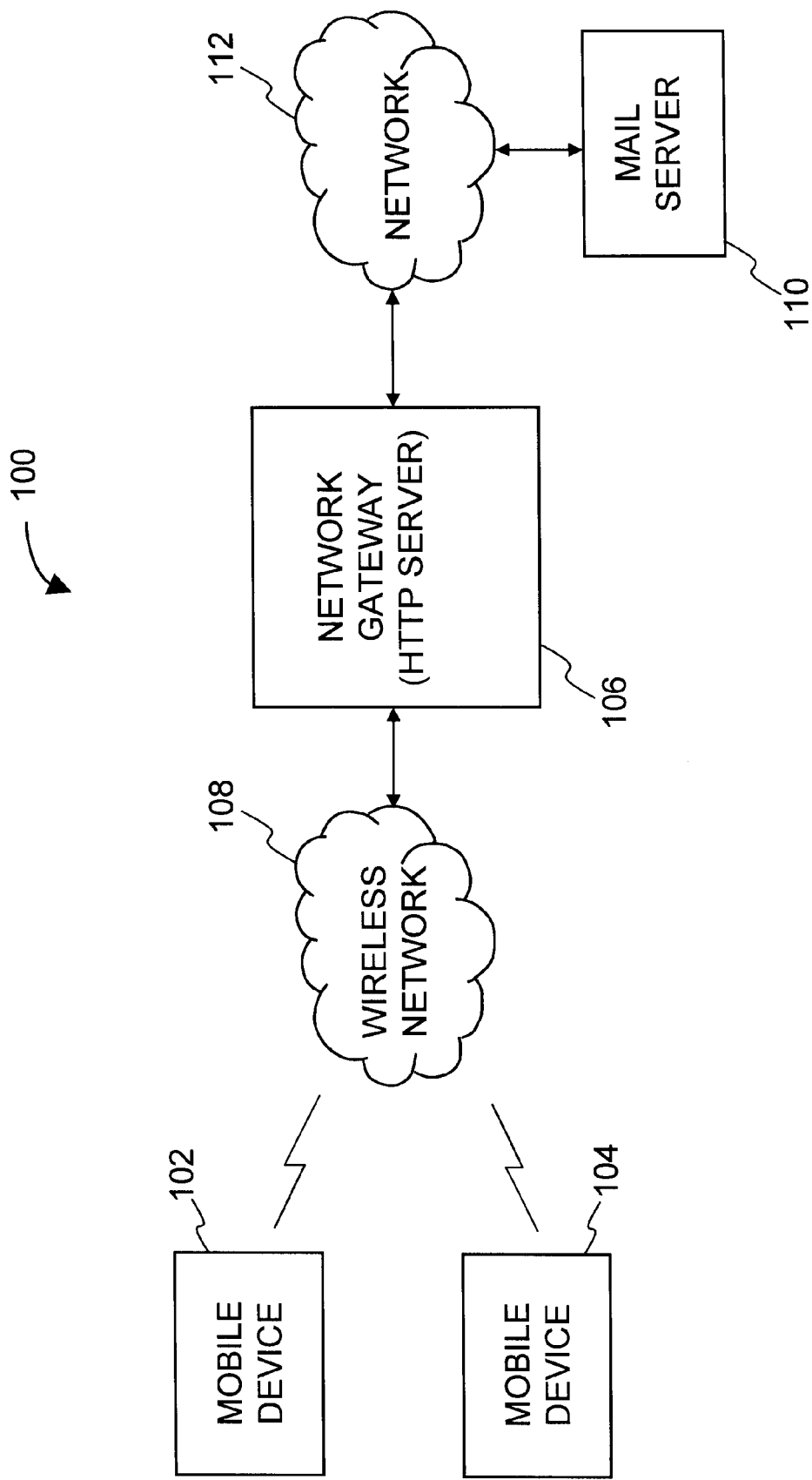
FIG. 1 is a block diagram of a wireless data communications system according to an embodiment of the invention.

FIG. 1 is a block diagram of a wireless data communications system 100 according to an embodiment of the invention. The wireless data communication system 100 includes mobile devices 102 and 104. Normally, the wireless data communication system 100 supports a large number of mobile devices, and thus the mobile devices 102 and 104 are representative of the mobile devices used. These mobile devices 102 and 104 can couple to a network gateway 106 through a wireless network 108. The network gateway 106 can also be referred to as a proxy server or wireless data server. The network gateway 106 is able to exchange information with a mail server 110. The network gateway 106 and the mail server 110 are interconnected through a network 112. The mail server 110 manages the storage and delivery of electronic mail messages to the appropriate location (e.g., the mobile devices 102 and 104). Typically, the network 112 is a wired network. As an example, the network 112 can be a local area network (LAN), a wired area network (WAN), the Internet, or some combination thereof. In one embodiment, the network 112 is the Internet and the network gateway 106 and the mail server 110 are HTTP servers.

Conventionally, all the resources associated with the electronic mail service were stored only on the mail server. Hence, the mobile devices had to be in network communication with the mail server in order to perform electronic mail operations, such as viewing, deleting or creating electronic mail messages. This is also true for wired communication systems where local computers are required to be in network communication with a mail server in order to perform electronic mail operations. When in network communication, the mobile devices (or local computers) would request a list of electronic mail from the mail server through the network. Once the request list of electronic mail is received, the list would be displayed to a user. The user could then perform one of the electronic mail operations on one of the listed electronic mail messages. However, the electronic mail operations were all performed by the mail server and thus network communication was required. For example, if a user requested to delete a certain message from the list of electronic mail, then the request would be sent to the mail server. If the network was unavailable, the request would not be sent and thus the mobile device (or local computer) would wait for the network availability to return or eventually the mobile device (or local machine) would give up. Once received at the mail server, the mail server would process the delete request and then modify the list of electronic mail for the mobile device (or local machine). The modified list of electronic mail would then be sent to the mobile device (or local machine), again requiring network availability.

Due to sporadic connectivity, high latencies, congestion, range limitations, obstructions, network failures, etc., networks are occasionally unavailability (at least temporarily) to mobile devices (or local machines). During such network unavailability, conventional electronic mail systems do not allow the mobile machines (local machines) to complete electronic mail operations. Often, this causes the mobile device (or local machine) to incur delays which are unsatisfactory to the users of the mobile devices (or local machines). Thus, the conventional approaches to providing electronic mail to local devices are unsatisfactory. Namely, when the wireless network is not available to the mobile devices, the mobile devices are not able to perform any electronic mail functions.

According to the invention, the mobile devices 102 and 104 are able to perform many electronic mail functions even though the network is unavailable to the mobile devices. The mobile devices 102 and 104 are no longer dependent on the availability of network connectivity to the mail server 110 in order to provide electronic mail functions on the mobile devices 102 and 104.

The mobile devices can take a variety of forms. Examples of mobile devices include mobile computing devices, cellular or mobile phones, portable computer devices, personal digital assistant (PDA) devices.

Figure 2:
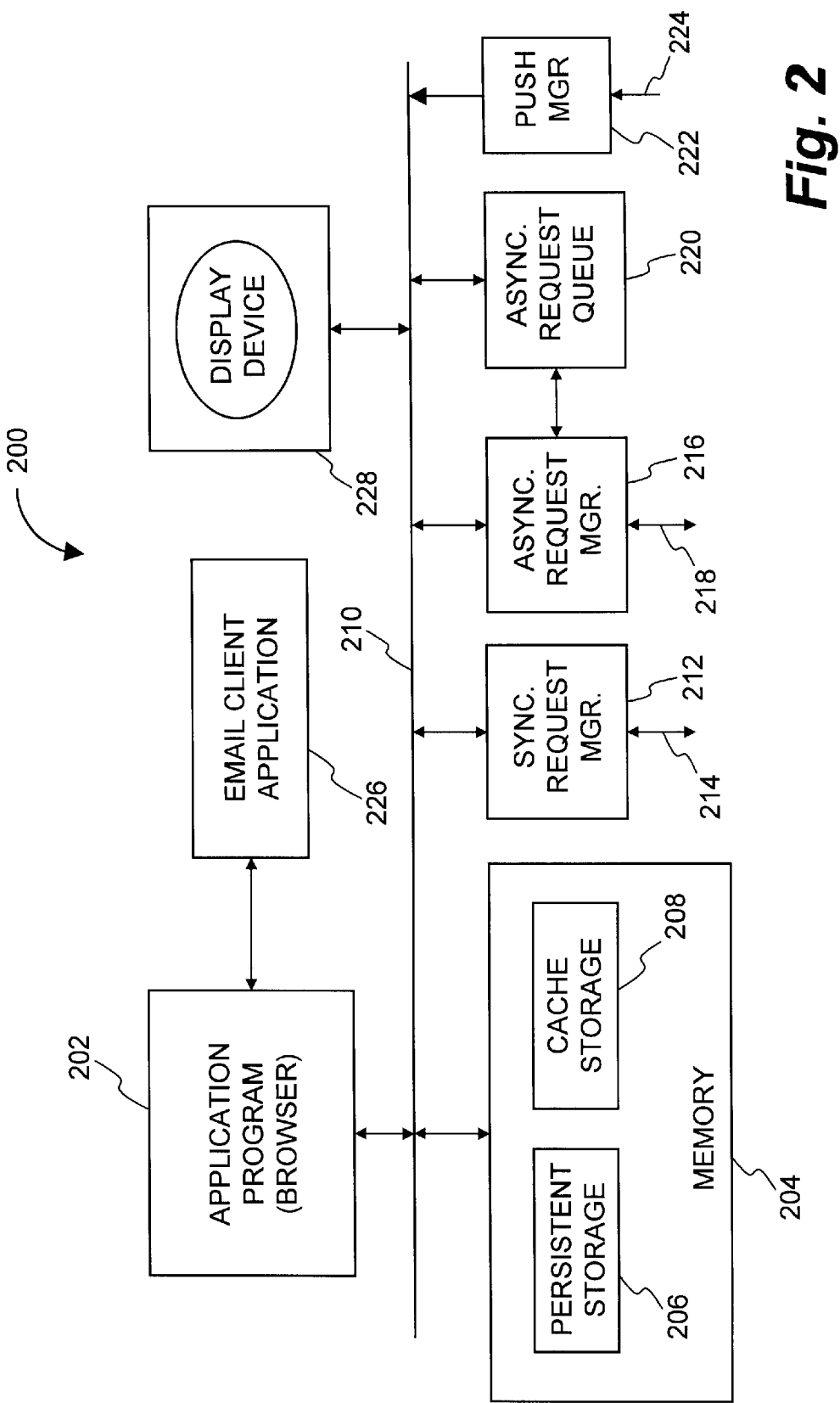
FIG. 2 is a block diagram of a mobile device according to an embodiment of the invention.

FIG. 2 is a block diagram of a mobile device 200 according to an embodiment of the invention. The mobile device 200 is, for example, suitable for use as the mobile device 102 or the mobile device 104 illustrated in FIG. 1. The mobile device 200 is particularly suited for wireless communications through a wireless network where connectivity is sporadic or high-latency conditions are present.

The mobile device 200 includes an application program that operates on the mobile device 200. In one embodiment, the application program 202 is a network browser. In one embodiment, the network browser is a micro-browser. A micro-browser is a network browser designed for a small screen interface such as with hand-held mobile devices. As an example, a micro-browser is produced by Unwired Planet, Inc. located at 800 Chesapeake Drive, Redwood City, Calif. 94063. The application program 202 interacts with a memory 204 that stores data for use by the application program 202. The memory 204 includes a persistent storage 206 and a cache storage 208. The persistent storage 206 is an area of the memory 204 that is protected from cache replacement or clean-up processing. The cache storage 208, on the other hand, is subject to cache replacement and cach-cleanup processing as is normal with cache type memory operations. A communication link 210 (or interface) connects with the memory 204 to the application program 202. The memory 204 is also often of a limited size due to limitations on size and power for mobile devices, particularly hand-held mobile devices.

The mobile device 200 also includes a synchronous request manager 212 that couples to the communication link 210. The synchronous request manager 212 manages synchronous requests for resources by the mobile device 200 to the mail server 110 (or other remote servers) via a communication link 214. In response to the synchronous requests, the synchronous request manager 212 also receives resources from the mail server 110 (or other remote servers) via the communication link 214. An asynchronous request manager 216 is also coupled to the communication link 210. The asynchronous request manager 216 operates to manage asynchronous requests for resources from the mobile device 200 to the mail server 110 (or other remote servers) via a communication link 218. The asynchronous request manager is connected to an asynchronous request queue 220 that is also connected to the communication link 210. The asynchronous request queue 220 stores asynchronous requests that are to be transmitted by the asynchronous request manger 216 to the mail server 110 (or other remote servers) when the network is available to the mobile device 200. Also, when the network is available to the mobile device 200, a push manager 222 receives incoming resources over a communication link 224. The push manager 222 is coupled to the communication bus 210 and is thus able to store the incoming resources in the memory 204.

The mobile device 200 also includes an electronic mail client application 226. The electronic mail client application 226 is coupled with the application program 202 so that electronic mail functions (operations) can be performed on the mobile device 200. As is explained in more detail below, the electronic mail client application 226 is able to operate properly even when the network is unavailable. The mobile device 200 also includes a display device (or screen) 228 that is coupled to the communication link 210. Among other things, the display device 228 operates to display electronic mail information for a user of the mobile device 200.

Figure 3:
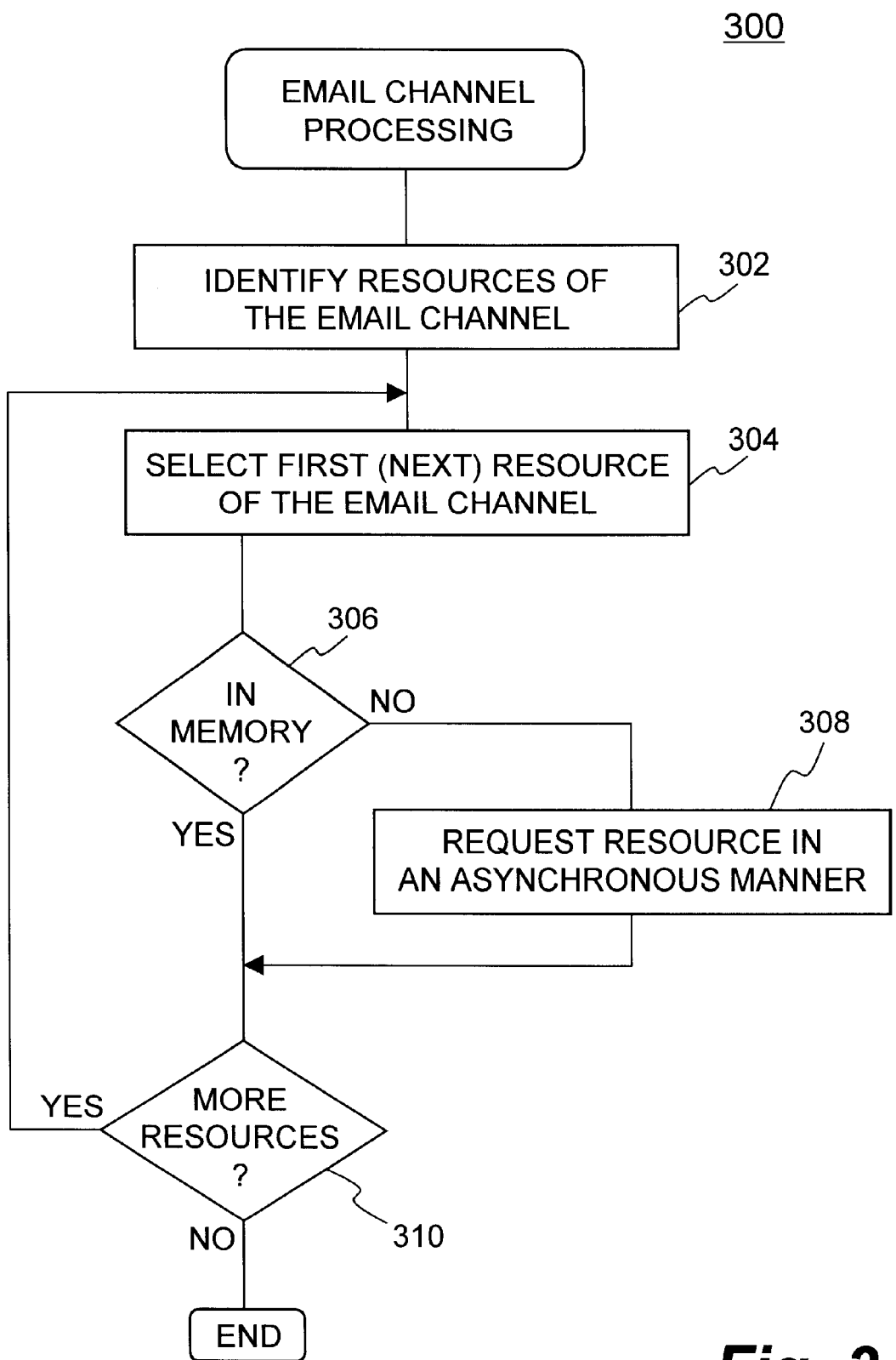
FIG. 3 is a flow diagram of electronic mail channel processing.

FIG. 3 is a flow diagram of electronic mail channel processing 300. The electronic mail channel processing 300 is performed by a mobile device when operating to pre-load channel resources into a memory of the mobile device. As an example, the channel resources can be pre-loaded into the memory 204 (namely, the persistent storage 206) of the mobile device 200 illustrated in FIG. 2. The advantage of the pre-loading is that the resources needed by the mobile device in interacting with the electronic mail are rapidly available regardless of network availability because the resources are resident on the mobile device.

The electronic mail channel processing 300 initially identifies 302 the resources of the electronic mail channel that is to be pre-loaded. Typically, various channels are available to the mobile device. Hence, a user of the mobile device is able to select those channels they desire to have resident in the memory (namely, the persistent storage 206) of the mobile device 200. Here, it is assumed that the electronic mail channel is to be pre-loaded into the memory of the mobile device. The identification of the resources of the electronic mail channel are those resources that would be needed by the mobile device when performing operations associated with the electronic mail on the mobile device. In one embodiment, the resources of the electronic mail channel include: electronic mail message list; contents of the messages; menu and data entry screens for electronic mail operations.

Following block 302, a first resource of the electronic mail channel is selected 304. Then, a decision block 306 determines whether the selected resource is found within the memory. Here, the memory pertains to the memory 204 (namely, the persistent storage 206) illustrated in FIG. 2. When the decision block 306 determines that the selected resource is not stored in the memory, then the resource is requested 308 from a remote server (e.g., the mail server 110) in an asynchronous manner. For example, with respect to FIG. 2, the resource being requested would be forwarded to the asynchronous request queue 220 and then eventually transmitted to the mail server 110 by the asynchronous request manager 216 when network availability permits. Because the request 308 for the resource is performed in an asynchronous manner, there is no need for the electronic mail channel processing 300 to await the arrival of the requested resource. Thus, the processing continues once the request for the resource is placed in the asynchronous request queue 220. The arrival of the previously requested resources are received in the background, for example, via the push manager 222.

Following block 308, as well as following the decision block 306 when the selected resource is in the memory, a decision block 310 determines whether there are more resources of the electronic mail channel to be pre-loaded. When the decision block 310 determines that there are more resources to be processed, the electronic mail channel processing 300 returns to repeat the block 304 and subsequent blocks. When repeating the block 304, the next resource of the electronic mail channel is selected. Alternatively, when the decision block 310 determines that there are no more resources to be processed, the electronic mail channel processing 300 is complete and ends.

Figure 4:
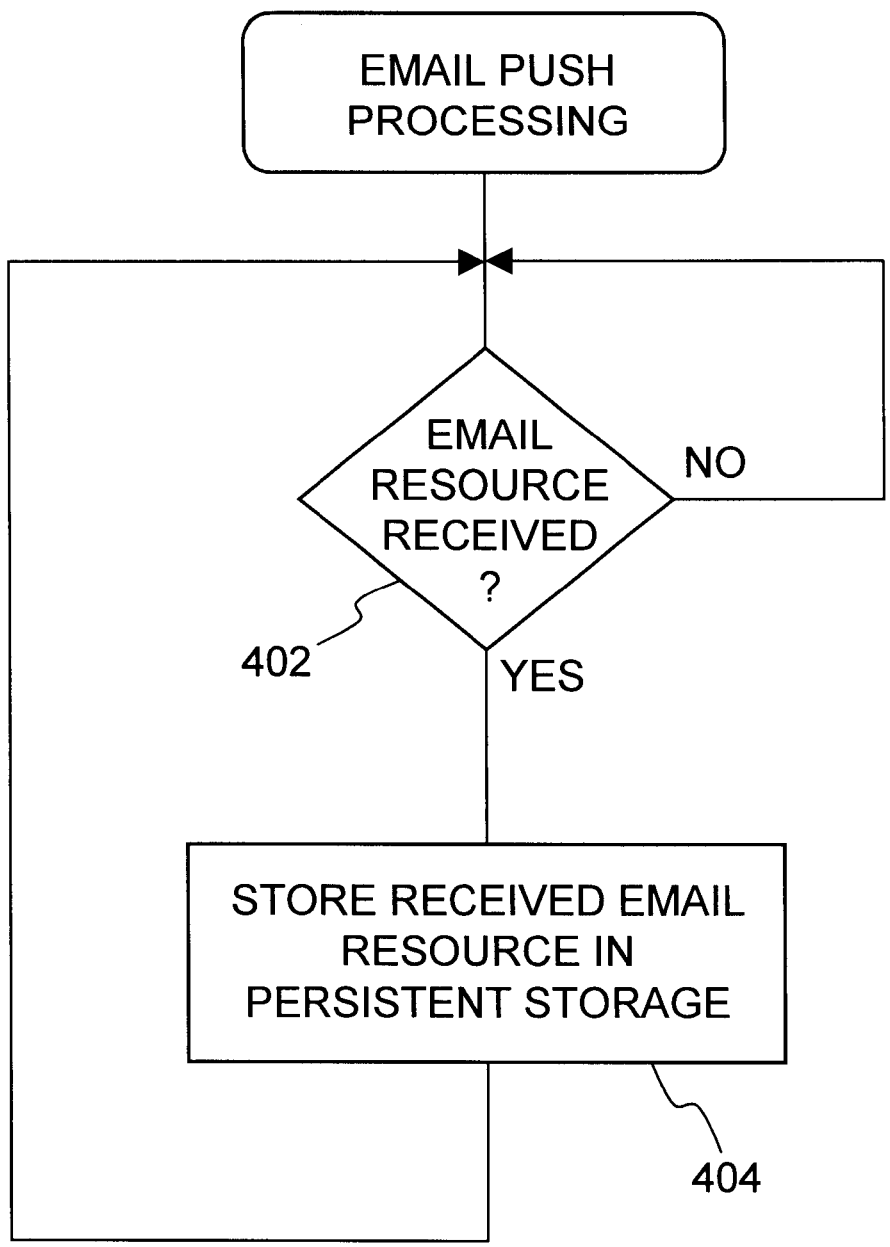
FIG. 4 is a flow diagram of electronic mail push processing according to an embodiment of the invention.

FIG. 4 is a flow diagram of electronic mail push processing 400 according to an embodiment of the invention. The electronic mail push processing 400 is performed on a mobile device. The electronic mail push processing 400 is the basic operation of the mobile device when receiving an incoming resource from the mail server over a push channel and arriving at the push manager 222 of the mobile device 200.

The electronic push processing 400 begins a decision block 402. The decision block 402 determines whether an electronic mail resource has been received. Typically, the mobile device can receive a variety of different types of resources over the push channel. In the case of the mobile device 200, the incoming resources to the mobile device 200 would be received by the push manager 222 and stored in the memory 204. In any event, the decision block 402 operates to invoke the electronic mail push processing 400 when an electronic mail resource has been received at the mobile device. When it is determined that an electronic mail resource has been received, the received electronic mail resource is stored 404 in persistent storage within the mobile device. For example, with respect to FIG. 2, the received electronic mail resource can be stored in the persistent storage 206 of the memory 204. Following block 404, the electronic mail push processing 400 returns to the beginning of the electronic mail push processing 400 so as to process the next received electronic mail resource.

Figure 5:
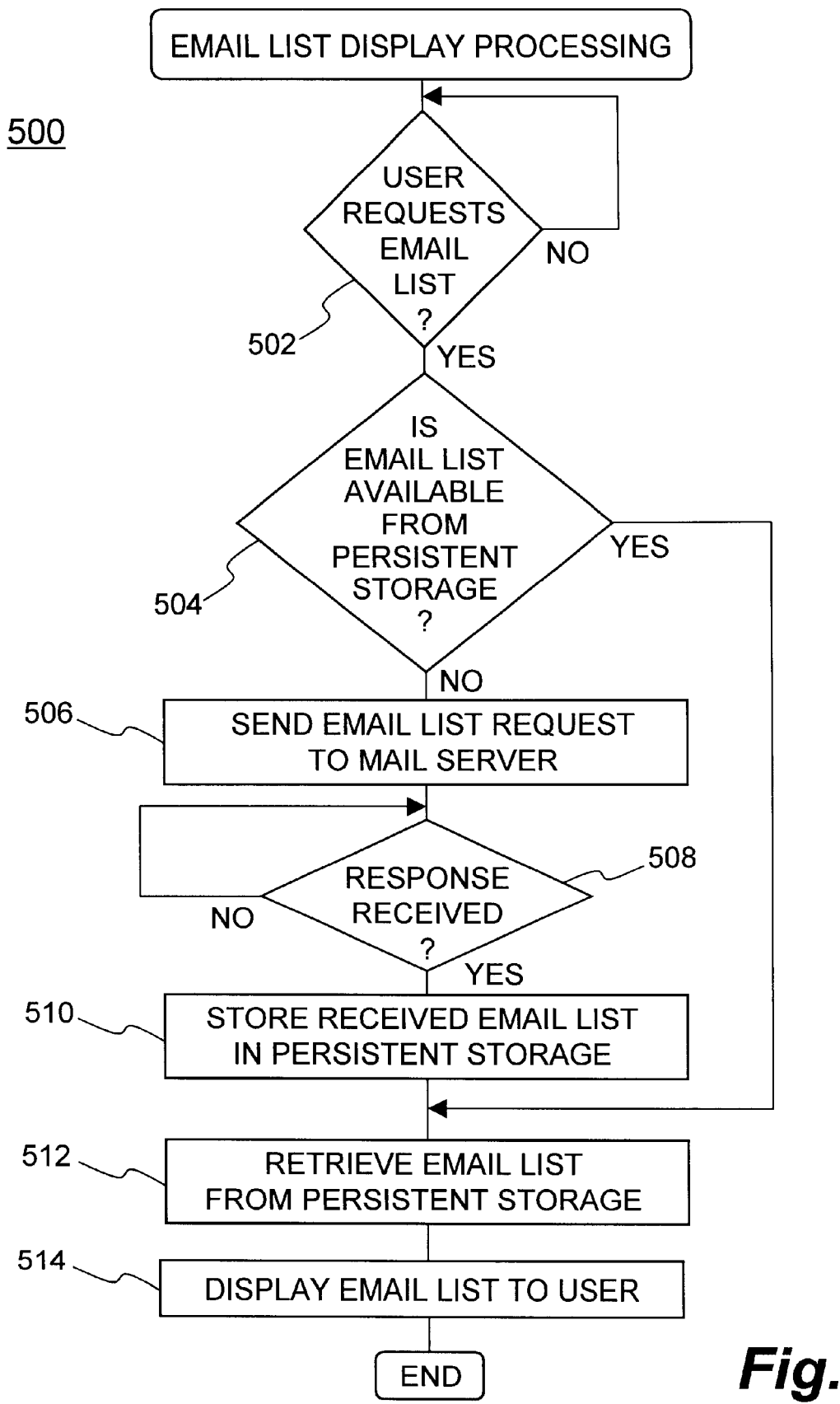
FIG. 5 is a flow diagram of electronic mail list display processing according to an embodiment of the invention.

FIG. 5 is a flow diagram of electronic mail list display processing 500 according to an embodiment of the invention. The electronic mail list display processing 500 is, for example, performed by the mobile device 200 under the control of the electronic mail client application 226 and the application program 202.

The electronic mail list display processing 500 begins with a decision block 502 that determines whether a user has requested an electronic mail list. When a user has not requested the electronic mail list, the decision block 502 causes the electronic mail list display processing 500 to be inactive. Once a user has requested the electronic mail list, then the electronic mail list display processing 500 is invoked.

Once evoked, a decision block 504 determines whether the electronic mail list is available from the persistent storage in the mobile device. For example, the electronic mail list will normally be stored in the persistent storage 206 of the memory 204. While it is anticipated that in many cases the electronic mail list will be available from the persistent storage due to the pre-loading (see FIG. 3), there are times in which the electronic mail list may not be available from the persistent storage. Hence, when the decision block 504 determines that the electronic mail list is not available from the persistent storage, an electronic mail list request is sent 506 to the mail server. Then, a decision block 508 determines whether a response to the electronic mail list request has been received. The response to the electronic mail list request would include the electronic mail list from the mail server. When the decision block 508 determines that the response has not yet been received, the electronic mail list display processing 500 awaits the reception of the response. In one embodiment, the electronic mail list request is a synchronous request that causes the mobile device to await the reception of the requested resource before processing continues. Such synchronous requests are, for example, handled by the synchronous request manager 212 illustrated in FIG. 2. Once the decision block 508 determines that the response has been received, the received electronic mail list is stored 510 in the persistent storage of the mobile device. Alternatively, when the decision block 504 determines that the electronic mail list is available from the persistent storage (due to pre-loading), then blocks 506–510 are bypassed.

Following block 510, as well as directly following the decision block 504 when the electronic mail list is available from the persistent storage, the electronic mail list is retrieved 512 from the persistent storage. Next, the electronic mail list is displayed 514 to the user. At this point, the electronic mail list has been displayed to the user and the system thereafter waits for additional operations to be requested by the user. Following block 514, the electronic mail list display processing 500 is complete and ends.

Figure 6:
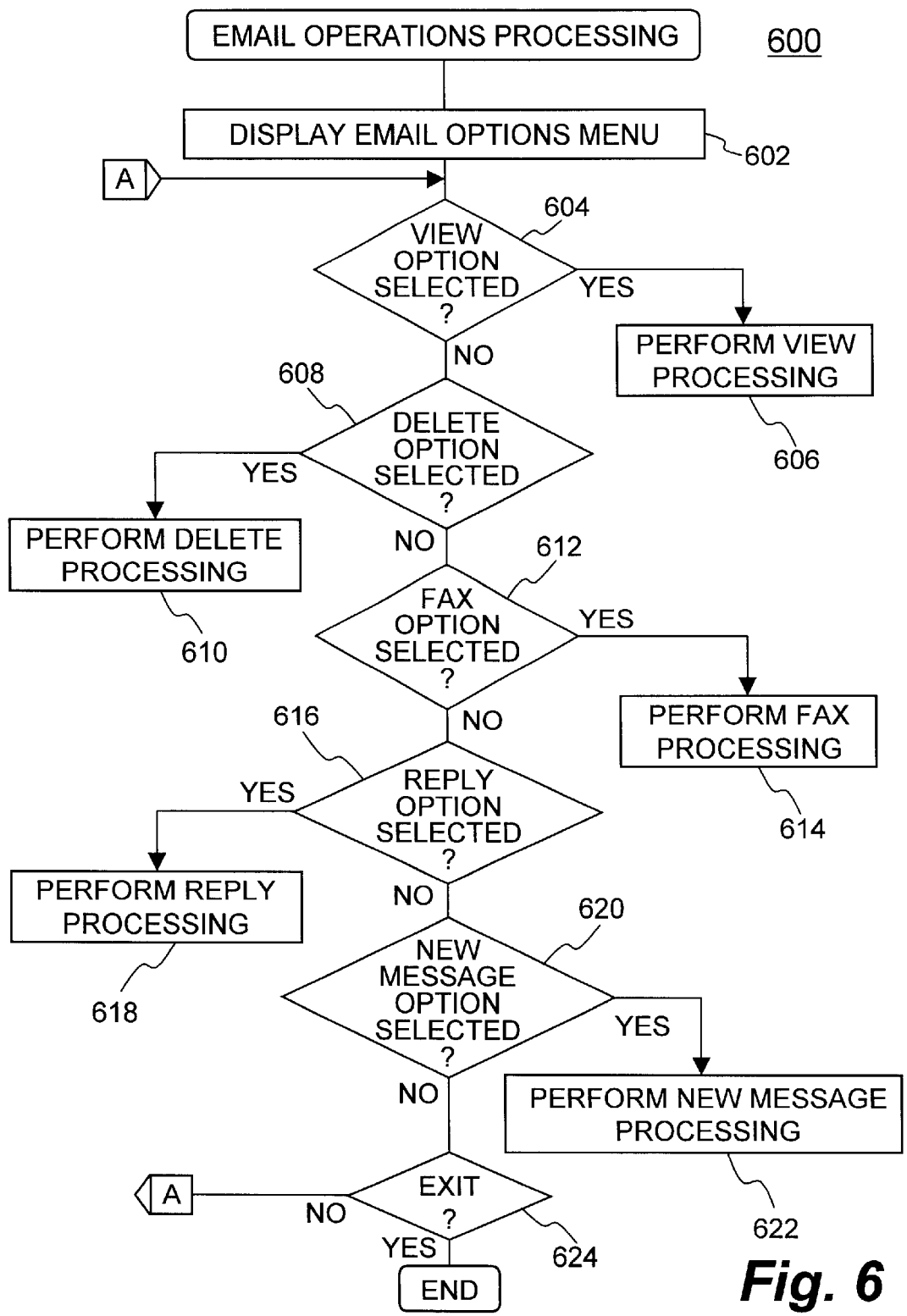
FIG. 6 is a flow diagram of electronic mail operations processing according to an embodiment of the invention.

FIG. 6 is a flow diagram of electronic mail operations processing 600 according to an embodiment of the invention. The electronic mail operations processing 600 assumes that the electronic mail list is presently displayed to the user of the mobile device (see FIG. 5). When the electronic mail operations processing 600 begins, an electronic mail options menu is displayed 602 on the mobile device. The electronic mail options menu can be displayed concurrently or separately with the electronic mail list. Next, the electronic mail operations processing 600 effectively waits for a user input that selects a particular electronic mail operation (function) to be performed with respect to the electronic mail list. These electronic mail operations include viewing, deleting, faxing, replying and creating electronic mail messages.

Once a user input has been entered, the electronic mail operations processing 600 determines the particular electronic mail operation to be performed with respect to the electronic mail list. A decision block 604 determines whether a view option has been selected. When the decision block 604 determines that the view option has been selected, view processing is performed 606. On the other hand, when the decision block 604 determines that the view option has not been selected, a decision block 608 determines whether a delete option has been selected. When the decision block 608 determines that the delete option has been selected, delete processing is performed 610. When the decision block determines that the delete option has not been selected, then a decision block 612 whether a fax (facsimile) option has been selected. When the decision block 612 determines that the fax option has been selected, then fax processing is performed 614. When the decision block 612 determines that the fax option has not been selected, then a decision block 616 determines whether a reply option has been selected. When the decision block 616 determines that a reply option has been selected, then reply processing is performed 618. When the decision block 616 determines that the reply option has not been selected, a decision block 620 determines whether a new message option has been selected. When a decision block 620 determines that the new message option has been selected, new message processing is performed 622. When the decision block 620 determines that the new message option has not been selected, a decision block 624 determines whether the user desires to exit the electronic mail operations processing 600. When the decision block 624 determines that the user desires to exit the electronic mail operations processing 600, then the electronic mail operations processing 600 is complete and ends. On the other hand, when the decision block 624 determines that the user does not desire to exit the electronic mail operations processing 600, then the electronic mail operations processing 600 returns to repeat the decision block 604 and subsequent blocks so that user inputs with respect to electronic mail operations can be processed.

Figure 7A:
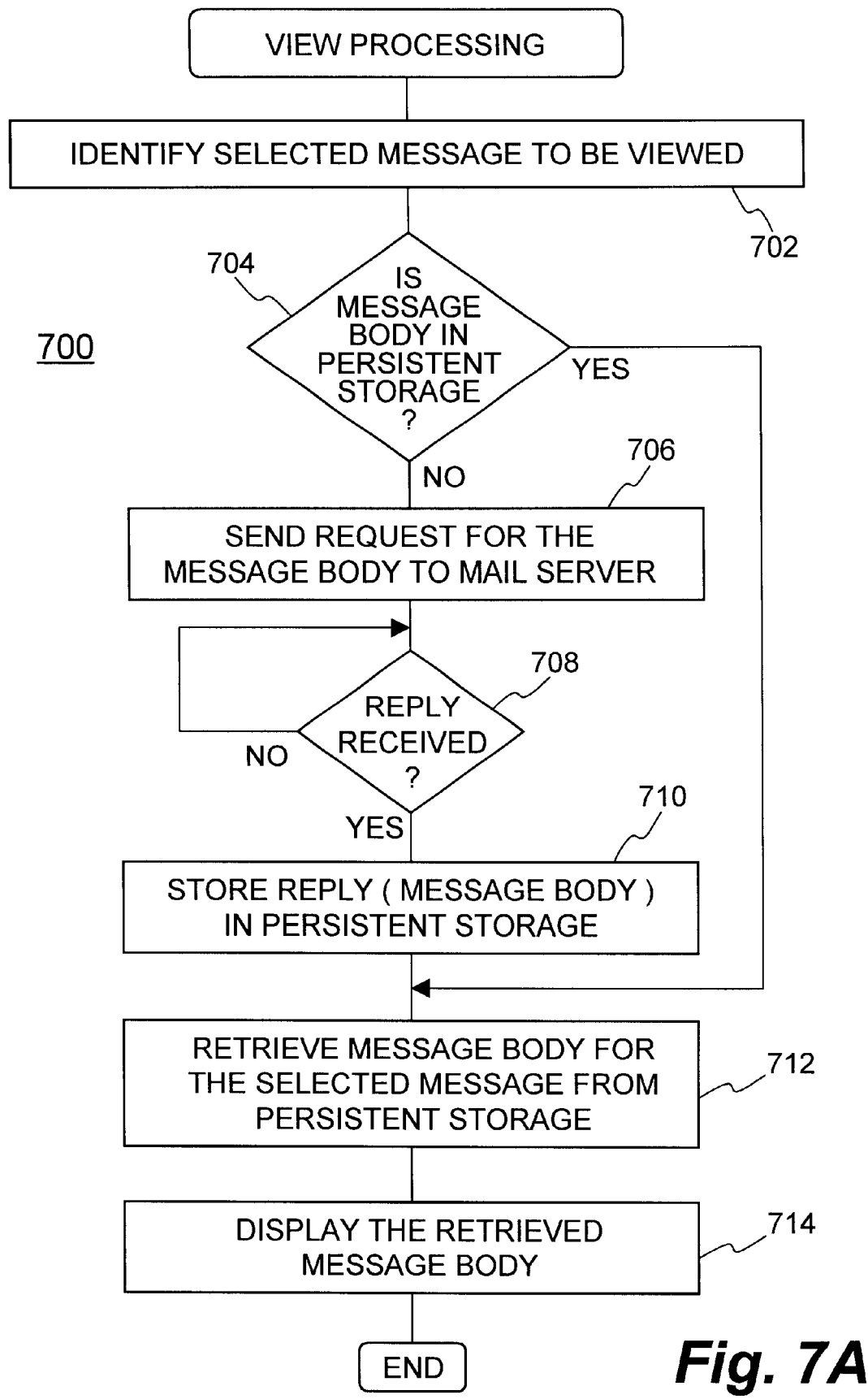
FIG. 7A is a flow diagram of view processing according to an embodiment of the invention.

FIG. 7A is a flow diagram of view processing 700 according to an embodiment of the invention. The view processing 700 is, for example, performed by the block 606 illustrated in FIG. 6.

The view processing 700 initially identifies 702 the selected message that is to be viewed. Typically, the user has acted to select one of the electronic mail messages in the electronic mail list being displayed (see FIG. 5), and then to request to view the selected message. In one embodiment, the selected message is identified by a message identifier. Next, a decision block 704 determines whether the message body associated with the selected message is stored in the persistent storage of the mobile device. When the message body is not stored in the persistent storage, a request for the message body is sent 706 to the mail server. This request for the message body is thus sent over the wireless data network to the mail server. Hence, when the network is unavailable to the mobile device, the request cannot be successfully transmitted and delays can occur. Following block 706, a decision block 708 determines whether a reply to the request for the message body has been received from the mail server. When the decision block 708 determines that the reply (the message body) has not yet been received from the mail server, the view processing 700 awaits the arrival of the reply. Once the decision blocks 708 determines that the reply (including the message body) has been received, the reply is stored 710 in the persistent storage of the mobile device. In one embodiment, the synchronous request manager 212 illustrated in FIG. 2 transmits the request and receives the reply from the mail server.

Alternatively, the blocks 706 through 710 of the view processing 700 are able to be bypassed when the decision block 704 determines that the message body already resides in the persistent storage of the mobile device. Thus, when the persistent storage has been pre-loaded to include the message body (i.e., a resource of the electronic mail channel) that is desired, the view processing 700 can operate without regard to network availability, and thus without network delays.

Following block 710, as well as directly following the decision block 704 when the message body is found within the persistent storage, the message body for the selected message is retrieved 712 from the persistent storage. The retrieved message body is then displayed 714 on the display device of the mobile device. Following block 714, the view processing 700 is complete and ends.

Figure 7B:
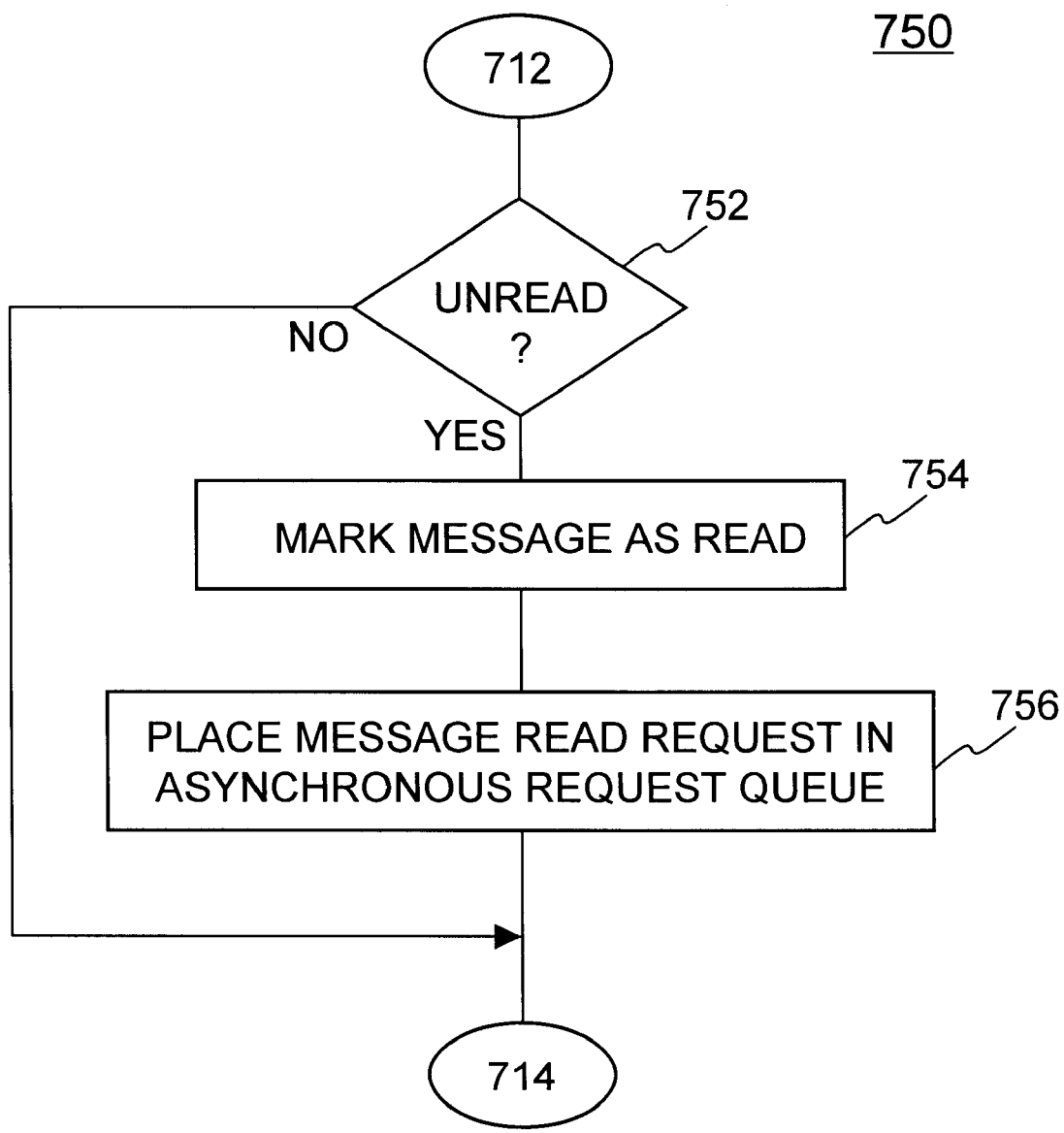
FIG. 7B is a flow diagram of an optional enhancement to the view processing 700 according to an embodiment of the invention.

FIG. 7B is a flow diagram of an optional enhancement to the view processing 700 according to an embodiment of the invention. The enchancement pertains to message marking processing 750 that can be performed between the block 712 and 714 of the view processing 700 illustrated in FIG. 7A. The message marking processing 750 allows the mobile device to asynchronously (i.e., background process) inform the mail server of those messages that have been read. The message marking processing 750 initially determines at decision block 752 whether the selected message has already been read. If the selected message has not already been read, then the message is marked as having been read because the message is displayed in block 712 for the user to read the message. After marking the message (i.e., the local copy) as being read, a message read request is placed 756 in the asynchronous message queue. The message read request will serve to inform the mail server that a particular message has been read, and thus allow the mail server to keep track of those message the user has read.

Figure 8:
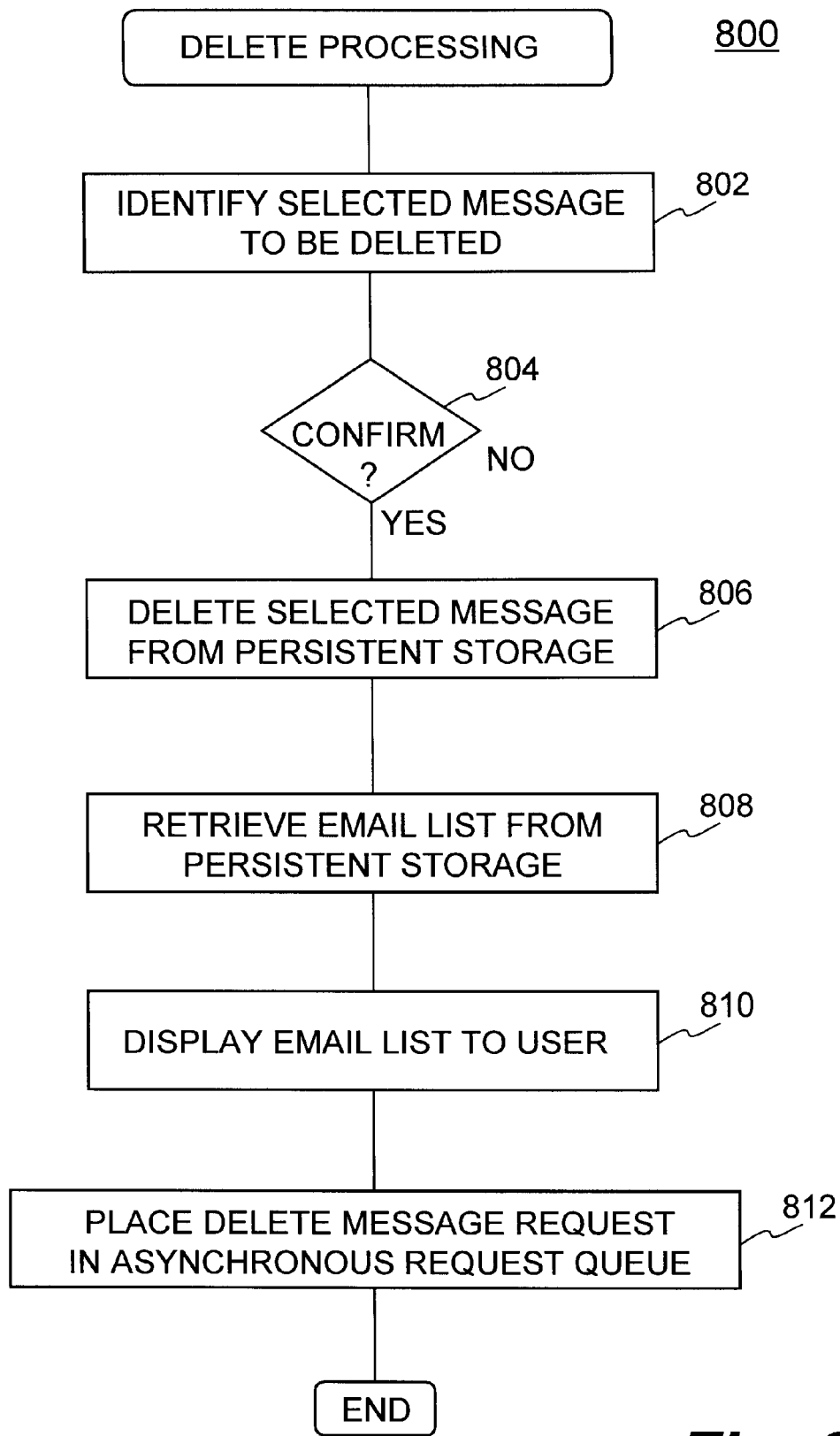
FIG. 8 is a flow diagram of delete processing according to an embodiment of the invention.

FIG. 8 is a flow diagram of the delete processing 800 according to an embodiment of the invention. The delete processing 800 is, for example, performed by block 610 illustrated in FIG. 6.

The delete processing 800 initially identifies 802 a selected message to be deleted. Typically, the user has acted to select one of the electronic mail messages in the electronic mail list being displayed (see FIG. 5), and then to request to delete the selected message. Next, a decision block 804 determines whether the user has confirmed the deletion of the selected message. When the user does not confirm the deletion of the selected message, the delete processing 800 is complete and ends because the user has not confirmed its deletion. On the other hand, when the decision block 804 determines that the user has confirmed the deletion of the selected message, then the selected message is deleted 806 from the persistent storage. The electronic mail list is then retrieved 808 from the persistent storage. The electronic mail list is retrieved 808 from the persistent storage so that an updated electronic mail list is provided. The retrieved electronic mail list is then displayed 810 to the user. As an example, with respect to the mobile device 200 illustrated in FIG. 2, the electronic mail list can be displayed on the display device 228. Additionally, a delete message request is placed 812 in an asynchronous request queue. For example, with respect to FIG. 2, the delete message request can be created by the electronic mail client application 226 and forwarded by the application program 202 to the asynchronous request queue 220. Thereafter, the asynchronous request manager 216 can process the delete message request by sending it to the mail server when the network is available so that the mail server can update its database of messages. Following block 812, the delete processing 800 is complete and ends.

Figure 9:
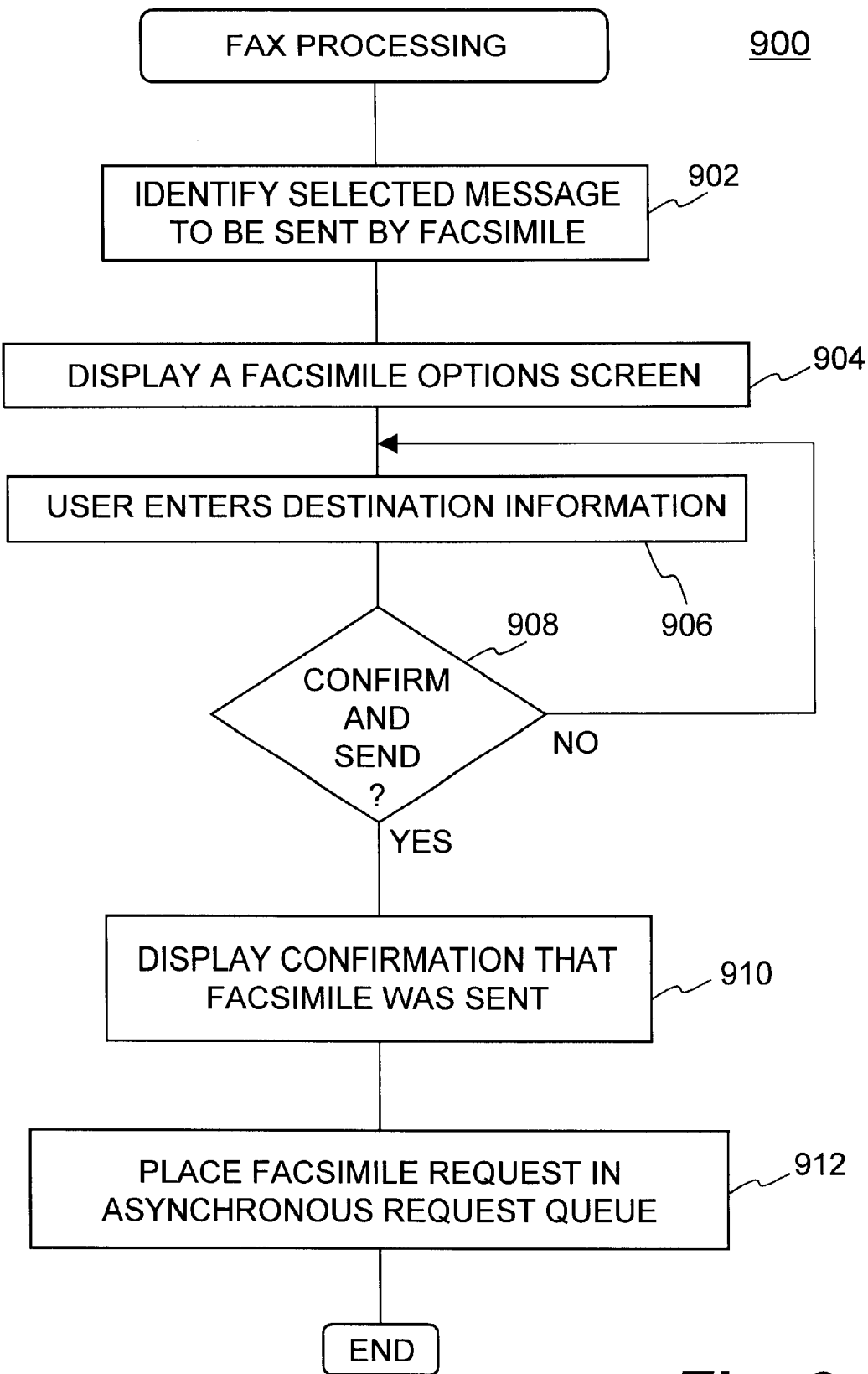
FIG. 9 is a flow diagram of fax processing according to an embodiment of the invention.

FIG. 9 is a flow diagram of fax processing 900 according to an embodiment of the invention. The fax processing 900 is, for example, performed by the block 614 illustrated in FIG. 6.

The fax processing 900 initially identifies 902 a selected message to be sent by facsimile. Typically, the user has acted to select one of the electronic mail messages in the electronic mail list being displayed (see FIG. 5), and then to request to transmit the selected message to a facsimile machine. A facsimile option screen is then displayed 904. The facsimile option screen allows a user to enter a destination information for a facsimile to be sent. The facsimile to be sent includes the contents of the selected message. Next, a user enters 906 the destination information which, for example, would include a facsimile telephone number and any suitable cover letter. A decision block 908 then determines whether the user has confirmed and requested to send the facsimile. When a decision block 908 determines that the user has not confirmed and requested to send the facsimile, the fax processing 900 awaits the user's confirmation and permits the user to alter the destination information. On the other hand, when the decision block 908 determines that the user has confirmed and requested to send the facsimile, a confirmation that the facsimile was sent is displayed 910. Additionally, a facsimile request is placed 912 in an asynchronous request queue. For example, with respect to FIG. 2, the facsimile request can be generated by the electronic mail client application 226 and forwarded by the application program 202 to the asynchronous request queue 220. Thereafter, the asynchronous request manager 216 can send the facsimile request to the mail server when network availability permits. Following block 912, the facsimile processing 900 is complete and ends.

Figure 10:
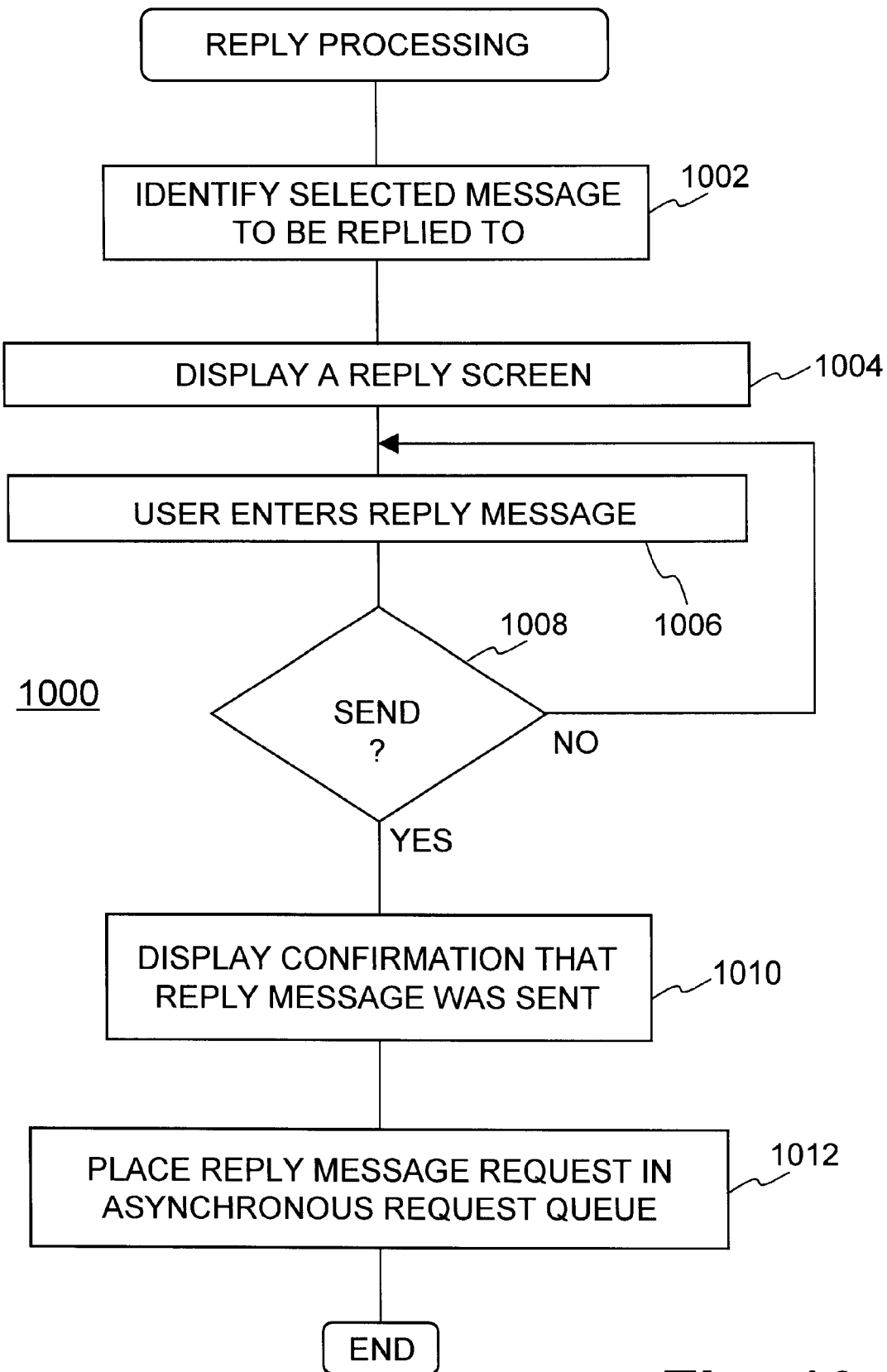
FIG. 10 is a flow diagram of reply processing according to an embodiment of the invention.

FIG. 10 is a flow diagram of reply processing 1000 according to an embodiment of the invention. The reply processing 1000 is, for example, performed by block 618 illustrated in FIG. 6.

The reply processing 1000 initially identifies 1002 a selected message that is to be replied to. Typically, the user has acted to select one of the electronic mail messages in the electronic mail list being displayed (see FIG. 5), and then to request to reply to the selected message. A reply screen is then displayed 1004. Next, the user then enters 1006 a reply message using the reply screen. Then, a decision block 1008 determines whether the user has requested to send the reply message. When the decision block 1008 determines that the user has not yet requested to send the reply message, the reply processing 1000 awaits the users request to send the reply message and permits the user to alter the reply message. Once the user has requested to send the reply message, a confirmation that the message was sent is displayed 1010. Additionally, a reply message request is placed 1012 in an asynchronous request queue. For example, with respect to FIG. 2, the reply message request can be generated by the electronic mail client application 226 and forwarded by the application program 202 to the asynchronous request queue 220. Thereafter, the asynchronous request manager 216 can send the reply message request to the mail server when network availability permits. Following block 1012, the reply processing 1000 is complete and ends.

Figure 11:
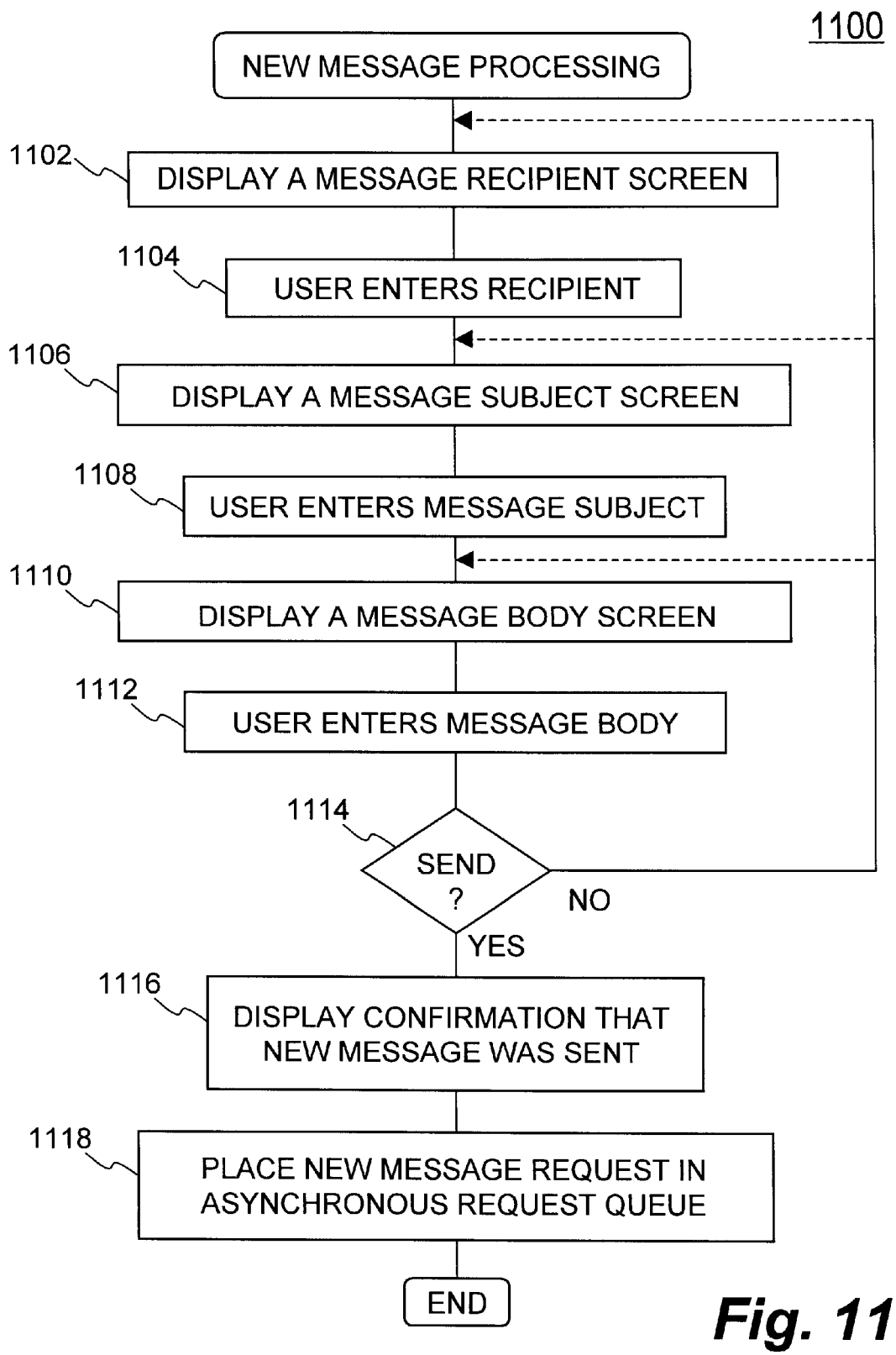
FIG. 11 is a flow diagram of new message processing according to an embodiment of the invention.

FIG. 11 is a flow diagram of new message processing 1100 according to an embodiment of the invention. The new message processing 1100 is, for example, performed by block 622 illustrated in FIG. 6.

The new message processing 1100 initially displays 1102 a message recipient screen. A user then enters 1104 a recipient into the message recipient screen. Next, a message subject screen is displayed 1106. A user then enters 1108 a message subject into the message subject screen. Next, a message body screen is displayed 1110. A user then enters 1112 a message body into the message body screen. Following block 1112, a decision block determines whether the user has requested to send the new message. When the user has not yet requested to send the message, the new message processing 1100 can return to repeat any of the prior blocks 1102–1112 so as to alter any previously entered information concerning the new message. On the other hand, once the decision block 1114 determines that the user has requested to send the message, then a confirmation that the new message was sent is displayed 1116. Additionally, a new message request is placed 1118 in an asynchronous request queue. For example, with respect to FIG. 2, the new message request can be generated by the electronic mail client application 226 and forwarded by the application program 202 to the asynchronous request queue 220. Thereafter, the asynchronous request manager 216 can send the new message request to the mail server when network availability permits. Following block 1118, the new message processing 1100 is complete and ends.

The asynchronous transmissions from the mobile device to the remote server (e.g., mail server) enable the mobile device to continue processing while these asynchronous transmissions occur in the background. Additionally, asynchronous reception (referred to as "push") can also occur in the background. Asynchronous transmissions are described further below with respect to FIG. 12, and asynchronous receptions are described further below with respect to FIG. 13.

Although not shown in FIG. 6, the electronic mail operations processing 600 can also include locking and unlocking electronic mail messages as another electronic mail operation. When a user interacts with the mobile device to "lock" a particular electronic mail message in an electronic mail list, the particular electronic mail message will remain locally stored and available in the persistent storage. In contrast, when an electronic mail message is not locked, it can be bumped out of the persistent storage to make room for a newer electronic mail message. A locked electronic mail message will remain in the persistent storage until deleted. Typically, the particular electronic mail message is locked by a user selecting a "lock" menu option when the electronic mail list is displayed on the display device. For visual feedback and notification, once a electronic mail message is locked, a distinctive icon can be displayed next to the electronic mail message in the electronic mail list.

Additionally, to facilitate easy entry of information into the various data entry screens for reply messages, fax destination information or new message information, one or more lists of most recently used data can be maintained (e.g., on the mobile device). A user is then able to enter the data for data input screen by selecting an entry in the appropriate list of most recently used data. For example, in FIG. 11, with respect to block 1104, a recent recipient list could be available to the user so that the user merely selects an entry in the recent recipient list without having to identify the recipient and their electronic mail address. Similarly, in FIG. 9, with respect to block 906, a recent facsimile numbers list and/or a recent recipient list could be available to the user for easy entry of data. In one embodiment, the number of entries stored in the list is small (e.g., 5–10) because of memory consumption and screen sizes with mobile devices. In any case, the entries in the various most recently used lists can be locked so that they are not removed from the lists.

Figure 12:
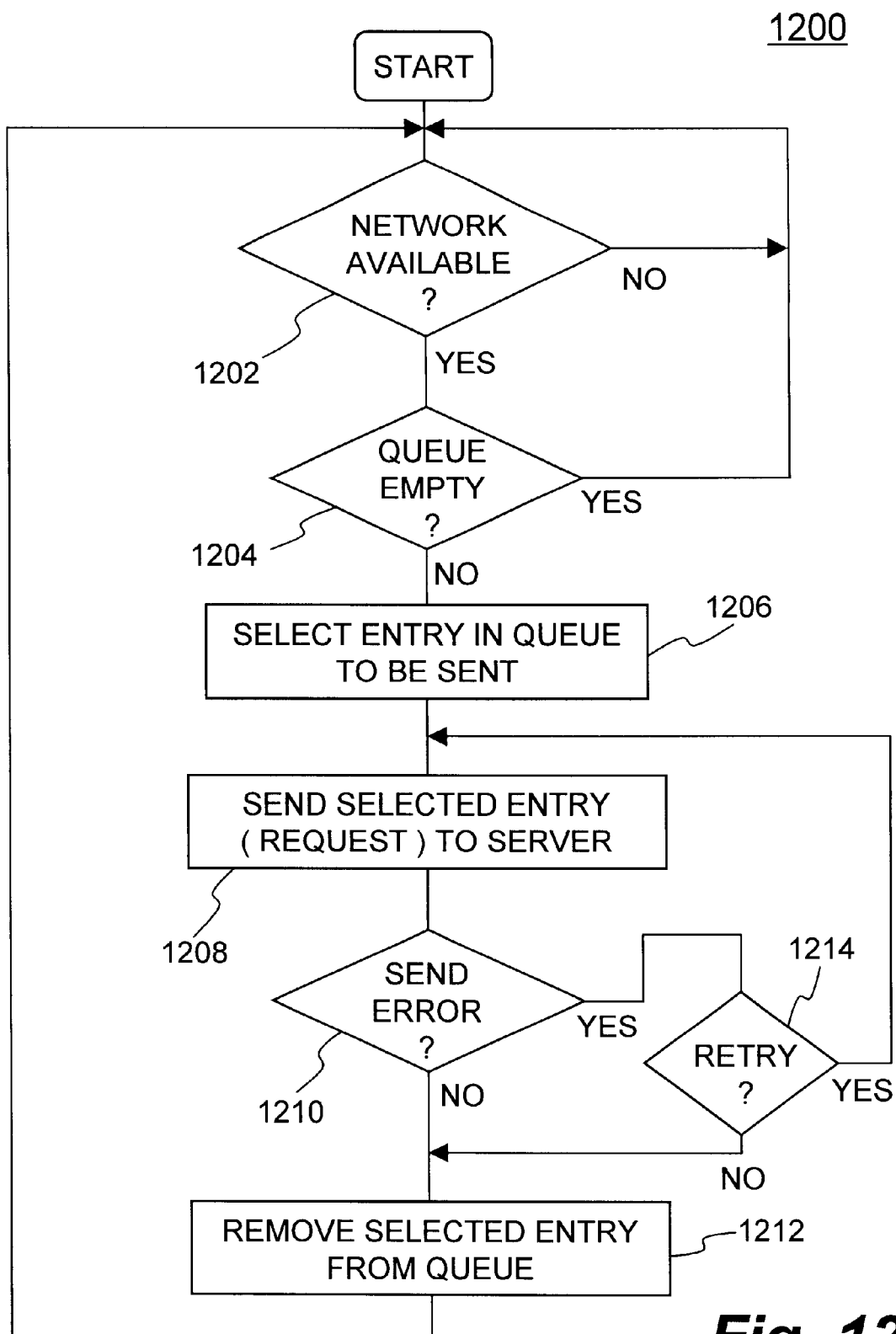
FIG. 12 is a flow diagram of asynchronous request send processing according to an embodiment of the invention.

FIG. 12 is a flow diagram of asynchronous request send processing 1200 according to an embodiment of the invention. The asynchronous request send processing 1200 is, for example, performed by the asynchronous request manager 216 illustrated in FIG. 2.

The asynchronous request send processing 1200 begins with a decision block 1202 that determines whether a wireless network is available to the mobile device. Wireless networks often have sporadic connectivity or high latency due to out-of-range, congestion, etc. and thus are temporarily unavailable to mobile devices. When the decision block 1202 determines that the wireless network is not available, then the asynchronous request send processing 1200 simply awaits the availability of the wireless network. Once the wireless network becomes available, then a decision block 1204 determines whether an asynchronous request queue is empty. The asynchronous request queue is within the mobile device and is, for example, the asynchronous request queue 220 illustrated in FIG. 2A.

When the decision block 1204 determines that the asynchronous request queue is empty, then the asynchronous request send processing 1200 returns to repeat the decision block 1202 and subsequent blocks because there is presently no requests waiting to be processed in the asynchronous request queue. On the other hand, when the asynchronous request queue is not empty, then an entry in the asynchronous request queue that is to be sent is selected 1206. The selected entry in the asynchronous request queue is then sent 1208 to a server via the wireless network. The server can be a proxy server or a remote server (e.g., mail server) on a remote network. Typically, according to the invention, the selected entry is a request for a electronic mail resource located at a mail server on the remote network.

After sending the selected entry to the server, a decision block 1210 determines whether a send error has occurred. In other words, the decision block 1210 waits for an acknowledgment that the server has received the selected entry that has been sent. When the decision block 1210 determines that no send error occurred during the sending of the selected entry to server, then the selected entry is removed 1212 from the asynchronous request queue. On the other hand, when the decision block 1210 determines that a send error has occurred, a decision block 1214 determines whether a retry is desired to re-send the selected entry to the server. When the decision block 1214 determines that a retry is desired, then processing returns to repeat the block 1208 and subsequent blocks. Alternatively, when the decision block 1214 determines that a retry is not desired, then processing proceeds to the block 1212 where the selected entry is removed 1212 from the asynchronous request queue. Following block 1212, the asynchronous request send processing 1200 returns to repeat the decision block 1202 and subsequent blocks so that additional entries in the queue can be processed.

Figure 13:
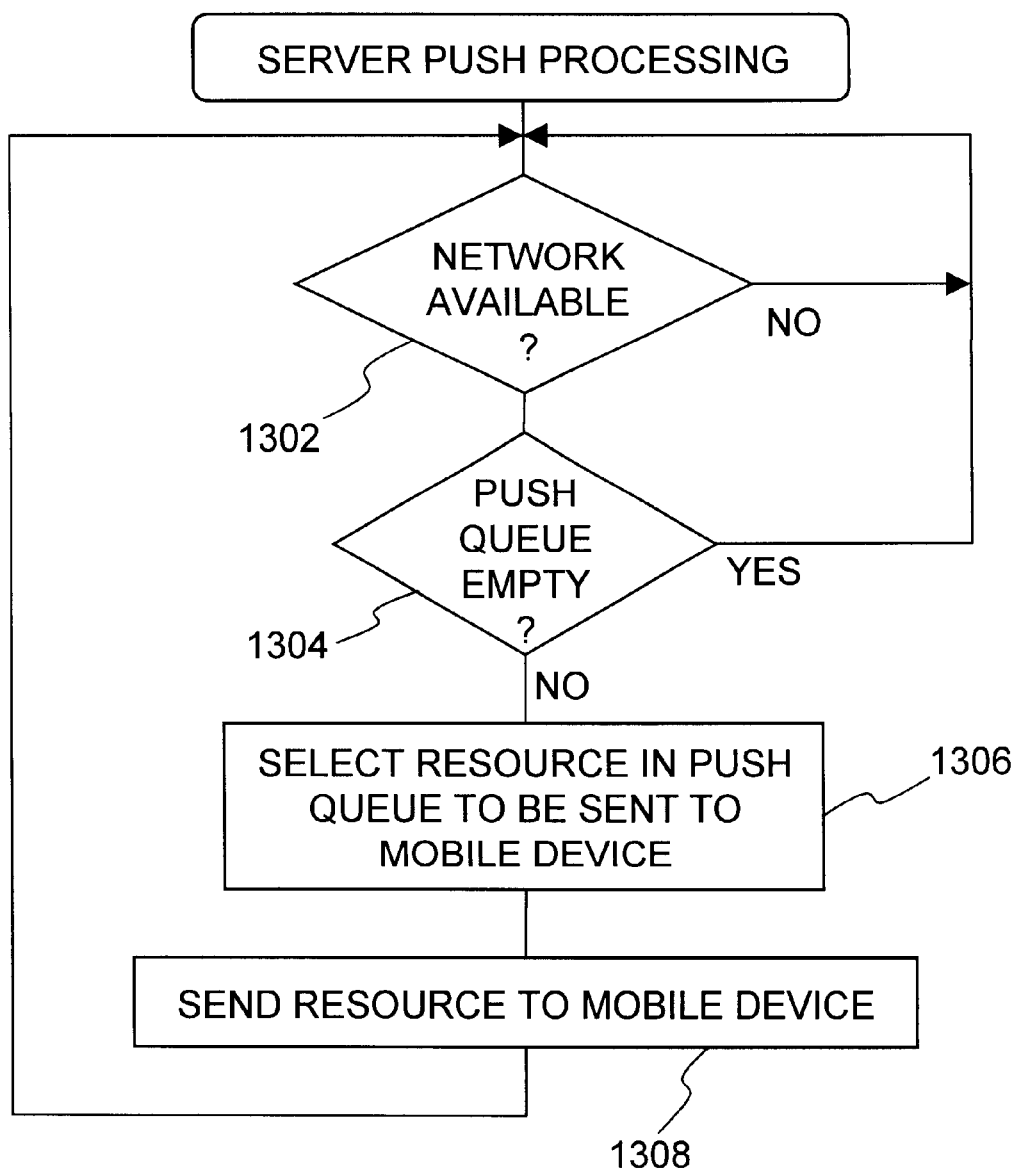
FIG. 13 is a flow diagram of server push processing according to an embodiment of the invention.

FIG. 13 is a flow diagram of server push processing 1300 according to an embodiment of the invention. The server push processing 1300 is, for example, performed by a network gateway (or proxy server) such as the network gateway 106 illustrated in FIG. 1.

The server push processing 1300 begins with a decision block 1302. The decision block 1302 determines whether the network is available. Here, the decision block 1302 is determining whether a wireless connection from the network gateway through the wireless network to the appropriate mobile device is available. When such network is not available, the server push processing 1300 is not evoked and merely awaits the availability of the network. When the network is available, a decision block 1304 determines whether a push queue is empty. The push queue contains resources (or replies to requests) that had been previously issued by the mobile device. In the case of electronic mail, the resources or replies to requests temporarily stored in the push queue are electronic mail resources. When the decision block 1304 determines that the push queue is empty, then there are no resources to be transmitted from the network gateway to the mobile device and thus the server push processing 1300 returns to repeat the decision block 1302 and subsequent blocks.

On the other hand, when the decision block 1304 determines that the push queue is not empty, then a resource in the push queue is selected 1306 to be sent to the mobile device. Then, the selected resource is sent 1308 to the mobile device. Following block 1308, the server push processing 1300 returns to repeat the decision block 1302 so that additional push requests can be forwarded to the mobile device. At the mobile device, the resources pushed are received and managed by a push manager, such as the push manager 222 illustrated in FIG. 2.

In one embodiment, the resources (e.g., electronic mail resources) stored in the push queue are limited in size. The resources can be limited in size anytime prior to being sent 1308 to the mobile device. For example, the mail server or the network gateway can operate to limit the size of the electronic mail resources. As an example, the size of the electronic mail resources can be limited to a predetermined maximum size. The maximum size can be set by the network gateway, the mail server, or the mobile device. While normally fixed, the maximum size could also be dynamically changed. In one exemplary embodiment, 400 bytes has been used as a maximum size. Then, once the electronic mail resources are sent 1308 to the mobile device they do not consume a large portion of the memory (namely, persistent storage) because they are of limited size. By limiting the electronic mail resources, the memory of the mobile device is able to store more electronic mail messages (which are of the limited size). Hence, the memory of the mobile device (which itself is of limited capacity) is intelligently used.

Typically, the limiting operates to limit the size of the message bodies. Thus, when a user views a message body only the first portion of the message body is initially displayable to the user. When there is additional portions of the message body, the user can be informed via the display screen that additional portions can be requested. If the user requests a next portion, then a synchronous request for the next portion is sent to the mail server and the next portion of the message body is thereafter received and displayed. Again, the next portion can also be of limited size. Additionally, a percentage of the portion of the total message that has been read can be displayed on the display screen for the user. The percentage would increase with each next portion read until all (100%) of the message is read.

Figure 14:
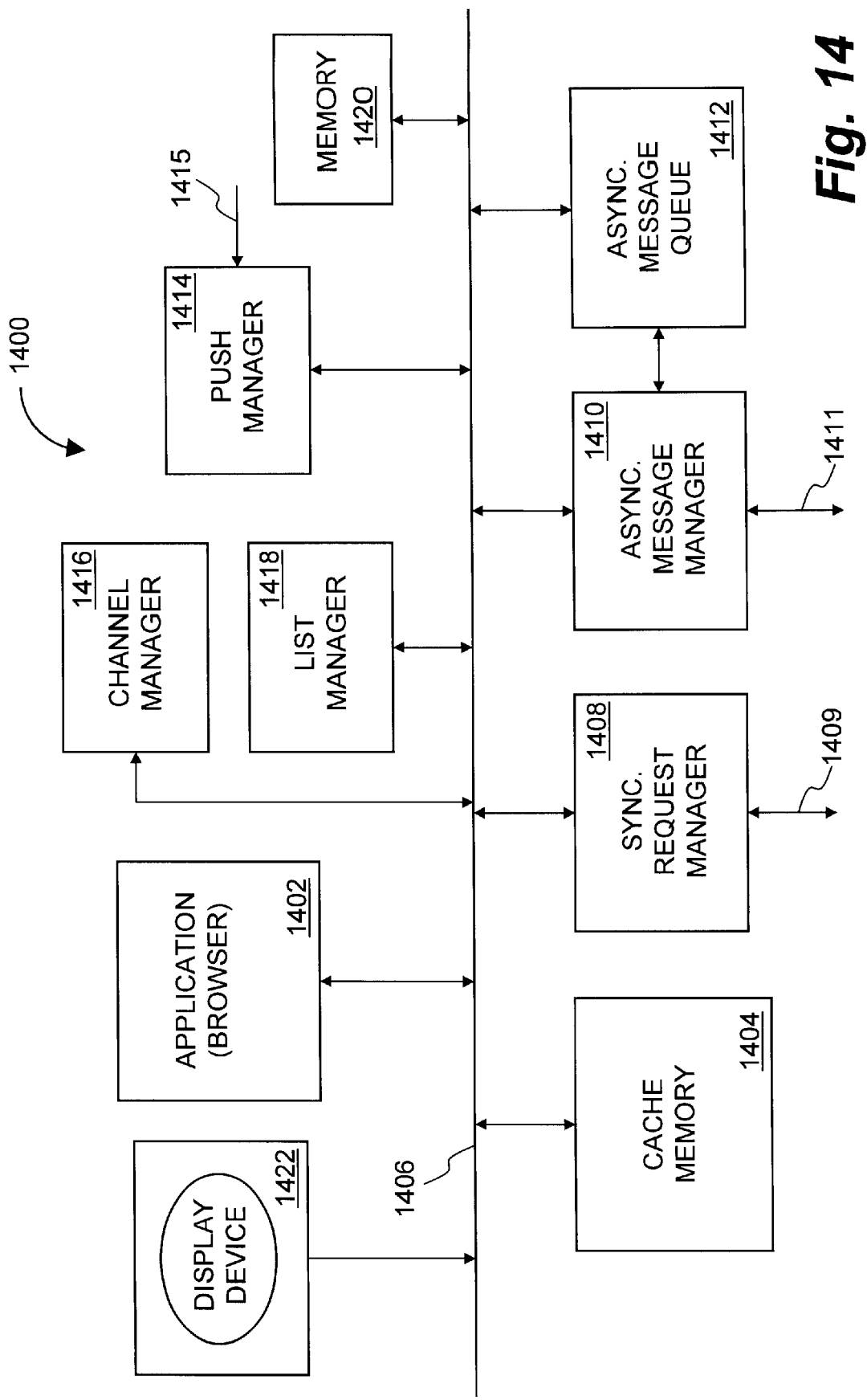
FIG. 14 is a block diagram of a mobile device according to another embodiment of the invention.

FIG. 14 is a block diagram of a mobile device 1400 according to another embodiment of the invention. Like the mobile device 200 illustrated in FIG. 2, the mobile device 1400 is particularly suited for wireless communications through a wireless network where connectivity is sporadic or high-latency conditions are present.

The mobile device 1400 includes an application 1402 that couples to a cache memory 1404 through an interface 1406. The application 1402 is, for example, a network browser application that allows a user of the mobile device 1400 to request and receive resources provided on a remote network (e.g., Internet) that the mobile device 1400 is able to communicate with. The cache memory 1404 stores resources that have been previously requested and received by the mobile device 1400. Additionally, the cache memory 1404 can be used to store various channels and lists that are used to improve performance of the mobile device 1400.

The mobile device 1400 also includes a synchronous request manager 1408 and an asynchronous message manager 1410. The synchronous request manager 1408 manages the synchronous sending and receiving of messages with respect to the remote network a wireless communication link 1409. The asynchronous message manager 1410 manages the asynchronous sending of messages with respect to the network via a wireless communication link 1411. The asynchronous message manager 1410 is provided so that the mobile device 1400 can communicate with the remote network in an asynchronous manner. The ability of the mobile device 1400 to communicate in an asynchronous manner is particularly useful in cases where the wireless network has high-latency conditions or suffers from sporadic connectivity.

The asynchronous message manager 1410 connects to an asynchronous message queue 1412 that stores messages that are to be sent to the remote network via the asynchronous message manager 1410 and the wireless communication link 1411. In general, the messages awaiting transmission to the remote network remain in the asynchronous message queue 1412 until the asynchronous message manager 1410 determines that the wireless network is available, and then proceeds to service the particular messages stored in the asynchronous message queue 1412 such that they are sent to the remote network through the wireless communication link 1411 of the wireless network when the wireless network is available.

The push manager 1414 receives pushed messages (e.g., resources) from the remote network over a wireless communication link 1415. These pushed messages that are received by the push manager 1414 over the wireless communication link 1415 are either in response to requests that have been asynchronously sent by the mobile device 1400 or provided ("pushed") by a remote server to the mobile device 1400 connects via the wireless network.

The mobile device 1400 also includes a channel manager 1416 and a list manager 1418. The channel manager 1416 operates to load certain content channels into the cache memory 1404 of the mobile device 1400. According to the invention, one pertinent content channel is an electronic mail channel, which includes electronic mail resources associated with providing electronic mail services the mobile device 1400. The content channels are loaded into the cache memory 1404 by the channel manager 1416 so that the performance of the mobile device 1400 is improved with respect to the particular content associated with the content channels loaded in the cache memory 1404. In particular, should a user of the mobile device 1400 request (via the application 1402) a resource associated with a content channel stored in the cache memory 1404, then the requested resource can be rapidly supplied to application 1402 via the cache memory 1404. Otherwise, when a requested resource is not found in the cache memory 1404, the availability of the requested resource at the mobile device is relatively slow because the request must be sent to either the synchronous request manager 1408 or the asynchronous message manager 1410 to obtain the resource from a remote server located on the remote network.

The list manager 1418 operates to store one or more lists in a memory 1420 (e.g., random-access memory). The lists that are stored in the memory 1420 are used to enable the list manager 1418 to manipulate various lists that are used by user interfaces associated with the application 1402. The user interfaces operate to display the various lists on a display 1422. Such lists are thus able to be modified locally within the mobile device 1400 without the need for availability of the wireless network. According to the invention, one pertinent list that is managed by the list manager 1418 is an electronic mail list that is displayed in the display 1422 and able to be locally modified without regard to network availability. The memory 1420 can also store resources from the remote network that are used to configure or operate the mobile device 1400.

The advantages of the invention are numerous. Several advantages that embodiments of the invention may include are as follows. One advantage of the invention is that electronic mail services can be performed on electronic mail messages even when the network is unavailable. Clients, e.g., mobile devices, are able to perform electronic mail services regardless of network availability. As a result, clients experience better responsiveness and less waiting. Another advantage of the invention is that a mail server located on the network is able to be kept current by use of asynchronous messaging.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A mobile device for use with a wireless data communication network, said mobile device comprising:
    a memory storage device that stores electronic mail resources;
    an electronic mail processor that performs an electronic mail operation with respect to the electronic mail resources stored in said memory storage device, and wherein the electronic mail operation can be carried out at said mobile device even when the wireless data communication network is not available to said mobile device; and
    a display device that displays at least a part of one or more of the electronic mail resources.

2. A mobile device as recited in claim 1, wherein the storage of the electronic mail resources in said memory storage device is persistent and thus not subjected to cache removal processing.

3. A mobile device as recited in claim 1, wherein in performing the electronic mail operation when the wireless data communication network is not available, said electronic mail processor modifies the electronic mail resources stored in said memory storage device in accordance with the electronic mail operation being performed.

4. A mobile device as recited in claim 3, wherein a mail server is coupled to the wireless data communication network,
    wherein the electronic mail resources are pre-stored in said memory storage device,
    wherein the wireless data communication network is occasionally unavailable to said mobile device, and
    wherein said mobile device further comprises:
        an asynchronous message manager that sends an asynchronous message to the mail server when the wireless data communication network is available to said mobile device, the asynchronous message informing the mail server of the modification to the electronic mail resources that occurred while the wireless data communication network was not available.

5. A mobile device as recited in claim 4, wherein said mobile device further comprises:
    an asynchronous message queue operatively connected to said asynchronous message manager, said asynchronous request queue stores outgoing asynchronous messages to be sent from said mobile device to the mail server.

6. A mobile device as recited in claim 1, wherein a remote server is coupled to the wireless data communication network when the wireless data communication network is not available, and
    wherein in performing the electronic mail operation, said electronic mail processor causes an asynchronous message to be created and thereafter sent to the remote server when the wireless data communication network is available to said mobile device, the asynchronous message being based on the electronic mail operation being performed.

7. A mobile device as recited in claim 6, wherein the electronic mail operation is one of delete message, view message, reply message or new message.

8. A mobile device as recited in claim 1, wherein the electronic mail operation is one of delete message, view message, reply message or new message.

9. A mobile device as recited in claim 1, wherein said mobile device is one of a mobile telephone, a mobile pager, a mobile personal digital assistant, and a mobile computer.

10. A mobile device as recited in claim 1, wherein said mobile device is a mobile telephone.

11. A mobile device as recited in claim 1, wherein said memory storage device has a limited capacity, and wherein the size of the electronic mail resources being stored in said memory storage device are limited to be less than a predetermined maximum size.

12. A mobile device as recited in claim 1, wherein a mail server is coupled to the wireless data communication network,
    wherein the electronic mail resources are pre-stored in said memory storage device,
    wherein the wireless data communication network is occasionally unavailable to said mobile device, and
    wherein said electronic mail processor comprises a network browser that operates to retrieve the electronic mail resources from said memory storage device or the mail server.

13. A mobile device as recited in claim 12, wherein said mobile device is a mobile telephone, and wherein the network browser is a micro-browser.

14. A method for interacting with electronic mail messages on a mobile device, the mobile device being able to communicate with a mail server at least in part through a wireless data network, said method comprising:
    pre-loading electronic mail message resources into a storage device of the mobile device;
    receiving a request to view an electronic mail list;
    determining whether the electronic mail list is available from the storage device of the mobile device;
    receiving the electronic mail list from the storage device when the electronic mail list is determined to be available from the storage device of the mobile device;

requesting and subsequently receiving the electronic mail list from the mail server when the electronic mail list is determined not to be available from the storage device of the mobile device; and displaying the received electronic mail list.

15. A method as recited in claim 14, wherein the availability of the wireless data network to the mobile device is sporadic, and wherein when the electronic mail list is available from the storage device, the received electronic mail list can be displayed regardless of the availability of the wireless data network to the mobile device.

16. A method as recited in claim 14, wherein the electronic mail list identifies at least one electronic mail message, and wherein the electronic mail resources include at least the electronic mail list, and a message body for the at least one electronic mail message.

17. A method as recited in claim 16, wherein the electronic mail list includes a sender identifier and a subject for at least one electronic mail message.

18. A method as recited in claim 14, wherein the electronic mail list identifies a plurality of electronic mail messages, and wherein said method further comprises:

performing an operation on one of the electronic mail messages in the electronic mail list; and modifying the electronic mail resources stored in the storage device in accordance with the operation performed on the one of the electronic mail messages.

19. A method as recited in claim 18, wherein the operation is one of delete, view or reply.

20. A method as recited in claim 18, wherein the availability of the wireless data network to the mobile device is sporadic, wherein said method further comprises updating the electronic mail list being displayed after said modifying, and wherein when the electronic mail list is available from the storage device, the received electronic mail list can be displayed and modified regardless of the availability of the wireless data network to the mobile device and thus without waiting for the availability of the wireless data network.

21. A method as recited in claim 18, wherein said method further comprises:

forming an asynchronous request to the mail server to inform the mail server of the modification to the one of the electronic mail messages.

22. A method as recited in claim 18, wherein said method further comprises:

forming an asynchronous request to the mail server to inform the mail server of the modification to the one of the electronic mail messages; and thereafter sending the asynchronous request to the mail server when the wireless data network becomes available.

23. A method as recited in claim 17, wherein said method further comprises:

subsequently updating the electronic mail list being displayed.

24. A method as recited in claim 14, wherein the electronic mail message resources being pre-loaded into the storage device of the mobile device are previously limited to a predetermined maximum size.

25. A method as recited in claim 14, wherein the mobile device communicates with the mail server using a network browser.

26. A method as recited in claim 25, wherein the network browser is a micro-browser.

27. A method as recoted in claim 26, wherein said mobile device is a mobile telephone.

28. A method for interacting with electronic mail messages on a mobile device, the mobile device being able to connect to a remote mail server through a wireless data network, said method being performed by said mobile device and comprising:

displaying an electronic mail list on a display screen of the mobile device, the electronic mail list including one or more entries that identify particular electronic mail messages;

selecting one of the entries of the electronic mail list being displayed on the display screen of the mobile device;

performing an operation on the electronic mail message associated with the selected entry without delay due to the unavailability of the wireless data network to the mobile device; and asynchronously sending a notification to the remote mail server based on the operation previously performed on the electronic mail message associated with the selected entry when the wireless data network later becomes available to the mobile device.

29. A method as recited in claim 28, wherein when the operation performed on the electronic mail message requires the electronic mail list to be updated, the electronic mail list is re-displayed in its modified form without regard to whether the wireless data network is available to the mobile device.

30. A method as recited in claim 28, wherein said asynchronously sending of the notification message is deferred until the wireless data network is available to the mobile device.

31. A method as recited in claim 28, wherein the operation is a view operation, wherein a message body for the electronic mail message is stored in a storage device within the mobile device, and wherein said performing of the view operation on the electronic mail message operates to retrieve the message body from the storage device and then to display the message body on the display screen, without delay due to the unavailability of the wireless data network to the mobile device.

32. A method as recited in claim 28, wherein the operation is a delete operation, wherein data for the electronic mail message is stored in a storage device within the mobile device, and wherein said performing of the delete operation on the electronic mail message operates to delete the data of the electronic mail message associated with the selected entry from the storage device and then to re-display the electronic mail list on the display screen of the mobile device such that the selected entry is no longer present.

33. A method as recited in claim 32, wherein the notification asynchronously sent is a delete message request that is sent to the mail server via the wireless data network, and the delete message request is sent to the mail server in a background mode so that unavailability of the wireless data network to the mobile device does not delay the delete operation or subsequent operations from completing on the mobile device.

34. A method as recited in claim 28, wherein the operation is a facsimile operation, wherein said performing of the facsimile operation on the electronic mail message operates to display a facsimile options screen and to receive destination information for a facsimile of the electronic mail message, and wherein the notification asynchronously sent is a facsimile request that is sent to a remote server or the mail server via the wireless data network, and the facsimile request message is sent to the remote mail server in a background mode so that unavailability of the wireless data network to the mobile device does not delay the facsimile operation or subsequent operations from completing on the mobile device.

35. A method as recited in claim 28, wherein the operation is a reply operation, wherein said performing of the reply operation on the electronic mail message operates to display a reply screen and to receive reply message information for a reply message to the electronic mail message, and wherein the notification asynchronously sent is a reply message request that is sent to the mail server via the wireless data network, and the reply message request is sent to the mail server in a background mode so that unavailability of the wireless data network to the mobile device does not delay the reply operation or subsequent operations from completing on the mobile device.

36. A method as recited in claim 28, wherein the operation is a new message operation, wherein said performing of the new message operation on the electronic mail message operates to display a message data entry screen and to receive new message information for a new electronic mail message, and wherein the notification asynchronously sent is a new message request that is sent to the mail server via the wireless data network, and the new message request is sent to the mail server in a background mode so that unavailability of the wireless data network to the mobile device does not delay the new message operation or subsequent operations from completing on the mobile device.

37. A computer readable medium including computer program code for interacting with electronic mail messages on a computing device, the computing device being able to communicate with a mail server at least in part through a data network, said computer readable medium comprising:

computer program code configured to pre-load electronic mail message resources into a storage device of the computing device;

computer program code configured to receive a request to view an electronic mail list;

computer program code configured to determine whether the electronic mail list is available from the storage device of the computing device;

computer program code configured to receive the electronic mail list from the storage device when the electronic mail list is determined to be available from the storage device of the computing device;

computer program code configured to request and subsequently receive the electronic mail list from the mail server when the electronic mail list is determined not to be available from the storage device of the computing device; and computer program code configured to display the received electronic mail list.

38. A computer readable medium for interacting with electronic mail messages on a computing device, the computing device being able to connect to a remote mail server through a data network, said computer readable medium comprising:

computer program code configured to display an electronic mail list on a display screen of the computing device, the electronic mail list including one or more entries that identify particular electronic mail messages;

computer program code configured to select one of the entries of the electronic mail list being displayed on the display screen of the computing device;

computer program code configured to perform an operation on the electronic mail message associated with the selected entry without delay due to the unavailability of the wireless data network to the computing device; and computer program code configured to asynchronously send a notification to the remote mail server based on the operation performed on the electronic mail message associated with the selected entry when the data network is available to the computing device.

* * * * *